(12) United States Patent
Finke et al.

(10) Patent No.: US 12,143,504 B2
(45) Date of Patent: Nov. 12, 2024

(54) SYSTEM AND APPARATUS FOR PROVIDING AUTHENTICABLE ELECTRONIC COMMUNICATION

(71) Applicant: OnDefend Holdings, LLC, Jacksonville, FL (US)

(72) Inventors: Benjamin Finke, St Johns, FL (US); Christopher Freedman, Ponte Vedra Beach, FL (US)

(*) Notice: Subject to any disclaimer, the term of this patent is extended or adjusted under 35 U.S.C. 154(b) by 0 days.

(21) Appl. No.: 18/371,397

(22) Filed: Sep. 21, 2023

(65) Prior Publication Data
US 2024/0015029 A1    Jan. 11, 2024

Related U.S. Application Data

(63) Continuation-in-part of application No. 16/858,315, filed on Apr. 24, 2020, now abandoned, which is a continuation-in-part of application No. 16/548,178, filed on Aug. 22, 2019, now Pat. No. 10,673,636, which is a continuation of application No. 16/458,693, filed on Jul. 1, 2019, now abandoned.

(60) Provisional application No. 62/809,669, filed on Feb. 24, 2019.

(51) Int. Cl.
*H04L 9/32* (2006.01)
*H04L 51/18* (2022.01)

(52) U.S. Cl.
CPC ............ *H04L 9/3247* (2013.01); *H04L 51/18* (2013.01)

(58) Field of Classification Search
CPC .............................. H04L 51/18; H04L 9/3247
See application file for complete search history.

(56) References Cited

U.S. PATENT DOCUMENTS

| | | | |
|---|---|---|---|
| 6,842,628 B1* | 1/2005 | Arnold | H04L 51/224 713/181 |
| 8,073,912 B2 | 12/2011 | Kaplan | |
| 2003/0236847 A1* | 12/2003 | Benowitz | H04L 51/212 726/4 |

(Continued)

OTHER PUBLICATIONS

NPL search terms (Year: 2023).*

*Primary Examiner* — Syed A Zaidi
(74) *Attorney, Agent, or Firm* — Wilson Dutra, PLLC; Camille A. Wilson

(57) ABSTRACT

The present disclosure provides generally for systems and methods of authenticating one or more aspects of electronic communication. According to the present disclosure, authenticable communications may allow for authentication of at least a portion of the content of the electronic communication, which may limit potential damage caused by fraudulent communications. In some aspects, an authenticable communication may allow a recipient to confirm that the indicated source is the actual source of the authenticable communication. In some embodiments, the authentication may not require an exchange of encrypted communications or an exchange of communications solely within the same communication system. Authenticable communications may provide a separate layer of security that may allow a recipient to review the contents with confidence that the communication is not fraudulent. Further, authenticable communications may provide the additional security without requiring specialized software.

15 Claims, 29 Drawing Sheets

(56) References Cited

U.S. PATENT DOCUMENTS

| | | | |
|---|---|---|---|
| 2004/0236838 A1* | 11/2004 | Tout | H04L 51/212 |
| | | | 726/22 |
| 2004/0249895 A1* | 12/2004 | Way | H04L 63/08 |
| | | | 709/206 |
| 2005/0268101 A1* | 12/2005 | Gasparini | H04L 9/3247 |
| | | | 713/176 |
| 2008/0148370 A1 | 6/2008 | Allwright | |
| 2010/0313253 A1* | 12/2010 | Reiss | H04L 51/00 |
| | | | 709/206 |
| 2015/0269370 A1* | 9/2015 | Phillips | H04W 12/068 |
| | | | 726/7 |
| 2020/0374251 A1* | 11/2020 | Warshaw | H04L 51/56 |

* cited by examiner

SYSTEM AND APPARATUS FOR PROVIDING AUTHENTICABLE ELECTRONIC COMMUNICATION

CROSS-REFERENCE TO RELATED APPLICATION

This application is a continuation in part of and claims priority to and the full benefit of U.S. Nonprovisional patent application Ser. No. 16/858,315 (filed Apr. 24, 2020, and titled "SYSTEM AND APPARATUS FOR PROVIDING AUTHENTICABLE ELECTRONIC COMMUNICATION"), which claimed priority to and the full benefit of U.S. Nonprovisional patent application Ser. No. 16/458,693 (filed Jul. 1, 2019, and titled "SYSTEM AND APPARATUS FOR PROVIDING AUTHENTICABLE ELECTRONIC COMMUNICATION"), which claimed priority to and the full benefit of U.S. Provisional Patent Application Ser. No. 62/809,669 (filed Feb. 24, 2019, and titled "SYSTEM AND APPARATUS FOR PROVIDING AUTHENTICABLE ELECTRONIC COMMUNICATION"), the entire contents of which are incorporated in this application by reference.

BACKGROUND OF THE DISCLOSURE

Forgery has perplexed and stymied human trust since writing and the use of paper became pervasive, particularly for financial transactions. One of the first prohibitions against forgery was when the Romans outlawed falsifying documents that transferred land to heirs. Over time the extent of forgery broadened to include tampering, counterfeiting, and misrepresentation. Illegitimate conveyances evolved into falsifying paper notes as well. For example, in England during the early $19^{th}$ century, 1-pound notes were incredibly easy to replicate, which lead to the mass incarceration of approximately 100,000 people over a 7-year period. Laws continually developed to match the sophistication levels of those committing the forgery, though it was still difficult to identify incredibly convincing forgeries.

With the promulgation of technology, these issues increased a hundredfold. Where technology is meant to improve the quality of life and streamline certain processes, the continued concern of forgery or misrepresentation has denied more sensitive transactions the benefit of technology. Complex financial transactions or something as relatively straightforward as a house closing still rely on traditional methods of approval and confirmation. Certain banks warn consumers not to trust email communications sent from them or not to respond to phone calls where someone claims to be a representative from the bank. As a result, despite all the innovation that has occurred, the old models remain, meaning people still need to appear in person or by proxy for anything involving money transferring hands.

The problem continues even for less sensitive, but still incredibly critical, communications. Employees are now warned that, because of the sophistication of external technologies and techniques like phishing, not to click on certain emails or not to click on links within an email, even when those emails are purportedly from someone within their own company. This is compounded when an employee regularly receives communication from someone like a financial officer who has time constraints on closing a matter that involves money and expects the employee to diligently follow through on their requests. Sometimes the volume is such that it does not make sense for the financial officer to personally appear and make each request to the employee.

As a result, email authentication is used to prevent phishing, spoofing, spamming, and other forms of fraud. Because of the rising sophistication of these techniques, false senders were able to get passwords, account information, personally identifiable information, and financial information. False senders may also manipulate recipients to take certain actions, which could be harmful to themselves or others. Email authentication may help an internet service provider (ISP) properly identify the sender of an email and intercept or prevent these communications from going through. This practice is meant to simplify and automate the process of identifying a sender and is also supposed to improve the likelihood that a legitimate email goes to its intended recipient.

Three major forms of email authentication systems include the sender policy framework (SPF), the Domain-Keys identified mail (DKIM) method, and the Domain-based Message Authentication, Reporting, and Conformance (DMARC) system. SPF cross-checks the domain in a sender's email against the published record the sender has registered in the Domain Name System (DNS). DKIM is a cryptographic, signature-based form of email authentication, where public/private key pairs are generated and checked against each other to ensure that the message was not altered and was from the original sender. DMARC mixes the SPF and DKIM systems, which allows an administrator to specify which mechanism is used when sending an email from their domain. DMARC does not directly address whether an email is spam or fraudulent. Instead, it requires that a message passes either DKIM or SPF validation as well as a process called alignment.

Despite these current solutions to email communication authentication, it is clear the solutions require extensive integration and technical understanding that may confuse and unnecessarily complicate an everyday email user. Organizations with complex systems may be able to educate employees or customers to these methods, but there is still a steep education curve involved as well as an implementation process. Further, some of these authentication processes still cannot indicate whether an email is fraudulent.

SUMMARY OF THE DISCLOSURE

What is needed is a streamlined system and method to authenticate one or more aspects of an electronic communication on an individual or organization-wide basis. This would allow one or more recipients to confirm, for example and not limitation, whether the content of the electronic communication has been adjusted, altered, or otherwise modified in some way. In some embodiments, an authentication system may generate various options to authenticate a source of the authenticable communication.

The present disclosure relates to a computer-implemented method for providing an authenticable communication, wherein the computer-implemented method may comprise: receiving an electronic communication comprising at least an actual source and original content; and converting the electronic communication to an authenticable communication. In some aspects, converting may comprise generating at least one authentication mechanism for the authenticable communication, wherein the at least one authentication mechanism at least partially comprises at least one correlation between at least one detectable element of the electronic communication and an initial transmission of the electronic communication or the actual source of the electronic communication, wherein the initial transmission of the electronic communication comprises a primary data transmission pathway; and storing the at least one authentication mechanism in at least one memory resource.

In some aspects, an authenticable communication may comprise an actual source; at least one potential recipient, original content, and at least one authentication mechanism, wherein the authentication mechanism may allow one or more recipients to authenticate one or more aspects of the authenticable communication. In some implementations, corresponding computer systems, apparatus, and computer programs recorded on one or more computer storage devices, may be configured to perform the actions of the methods. Implementations of the described techniques may comprise hardware, a method or process, or computer software on a computer-accessible medium.

A system of one or more computers may be configured to perform particular operations or actions by virtue of having software, firmware, hardware, or a combination of them installed on the system that in operation may cause the system to perform the actions. One or more computer programs may be configured to perform particular operations or actions by virtue of including instructions that, when executed by data processing apparatus, may cause the apparatus to perform the actions. In some aspects, corresponding computer systems, apparatus, and computer programs recorded on one or more computer storage devices, may be configured to perform the actions of the methods.

BRIEF DESCRIPTION OF THE DRAWINGS

The accompanying drawings, that are incorporated in and constitute a part of this specification, illustrate several embodiments of the disclosure and, together with the description, serve to explain the principles of the disclosure.

DETAILED DESCRIPTION

Figure 1:
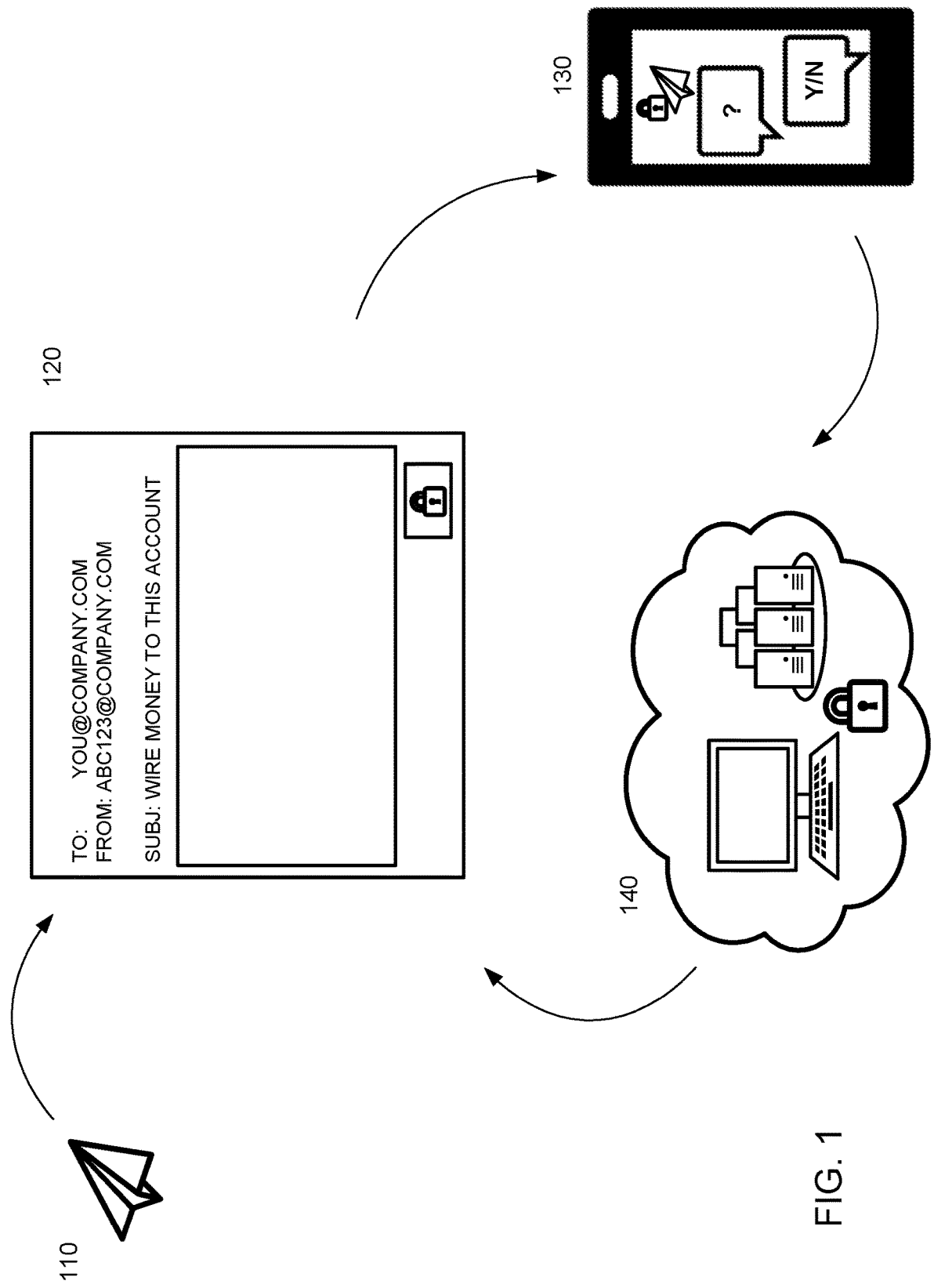
FIG. 1 illustrates an exemplary system of source authentication of an authenticable communication, according to some embodiments of the present disclosure.

The present disclosure provides generally for system and method of authenticating a source of electronic communication. According to the present disclosure, authenticable communications may allow for authentication of a source of the electronic communication, which may limit potential damage caused by fraudulent communications. In some aspects, an authenticable communication may allow the recipient to confirm that the indicated source is the actual source of the authenticable communication. In some embodiments, the authentication may not require an exchange of encrypted communications or an exchange of communications solely within the same communication system. Authenticable communications may provide a separate layer of security that may allow a recipient to review the contents with confidence that the communication is not fraudulent. Further, authenticable communications may provide the additional security without requiring specialized software.

In the following sections, detailed descriptions of examples and methods of the disclosure will be given. The description of both preferred and alternative examples though thorough are exemplary only, and it is understood that to those skilled in the art variations, modifications, and alterations may be apparent. It is therefore to be understood that the examples do not limit the broadness of the aspects of the underlying disclosure as defined by the claims.

Glossary

Authenticable Communication: as used herein refers to an electronic communication with at least one source authentication mechanism. In some aspects, an electronic communication may comprise a direct communication from a source to a recipient, such as an email, telemedicine, teleconferencing, video conferencing, or reservations. In some embodiments, an electronic communication may not have a specific recipient, such as a video, social media post, ad, video games, or article. In some implementations, an authenticable communication may be sent through an authenticable communication transmittal mechanism, such as an email application, enterprise application, authentication module, or other communication system.

Authentication Screen: as used herein refers to a screen that may at least partially obscure content in an authenticable communication, wherein the authentication screen may be removed when the authenticable communication is authenticated. In some embodiments, the authentication screen may be removed when one or both the sender or recipient is authenticated. In some implementations, the content of an authenticable communication may comprise attachments, text, images, links, or fillable forms, as non-limiting examples. In some embodiments, an authentication screen may comprise a message that may provide authentication information to a recipient, such as the purpose of the authentication screen, a prompt to authenticate, or an indication of the contents, as non-limiting examples.

Source Authentication: as used herein refers to verifying or confirming the source of an electronic communication. In some aspects, the source may be an individual person, such as a sender of an email or an author of an article. In some embodiments, the source may be an entity, such as an enterprise, business, or group. In some implementations, source authentication may occur by comparing an indicated source of an authenticable communication with the actual source. In some embodiments, the authenticable communication may further allow for verification that the recipient was the intended recipient.

Indicated Source: as used herein refers to an apparent source of an authenticable communication. For example, an indicated source may comprise an email address of a sender. In some aspects, a source may be indicated through branding or labeling on or near the authenticable communication. For example, an indicated source may comprise a person associated with a known social media handle, wherein the social media handle may be the apparent poster of a social media post. As another example, an indicated source may comprise an entity associated with a logo, wherein the logo may be embedded in a video.

Actual Source: as used herein refers to the true source of an authenticable communication. In some aspects, source authentication may confirm the indicated source and the actual source are the same. In some embodiments, source authentication may reject the indicated source and may find that the actual source of the authenticable communication is not the indicated source. In some non-limiting exemplary embodiments, an actual source may comprise a human, one or more machine learning or artificial intelligence algorithms, or both.

Referring now to FIG. 1, an exemplary system of source authentication of an authenticable communication 120 is illustrated. In some aspects, a source 110 may comprise a person or entity. In some embodiments, the authenticable communication 120 may comprise an indicated source, recipient, subject, and text body. In some implementations, the recipient may want to authenticate the source of the authenticable communication 120, such as where the authenticable communication 120 may include personal information, financial instruction, or other private communication.

In some aspects, a recipient may request source authentication, such as by clicking an icon within the email application. In some implementations, an authentication request may be transmitted to an indicated source 130. In some embodiments, a source authentication may comprise sending a text message to a phone number associated with the indicated source 130. In some aspects, a profile may be associated with a source, which may allow for the transmission of authentication requests when the indicated source is associated with the profile.

In some implementations, the response to the authentication request may be transmitted to an authentication system 140. In some aspects, the result of the authentication result may be transmitted back to the recipient. For example, a positive result may change an icon to a green check mark, and a negative result may change an icon to a red stop sign, which may indicate that the indicated source is not the actual source, such as through spoofing.

Figure 2A:
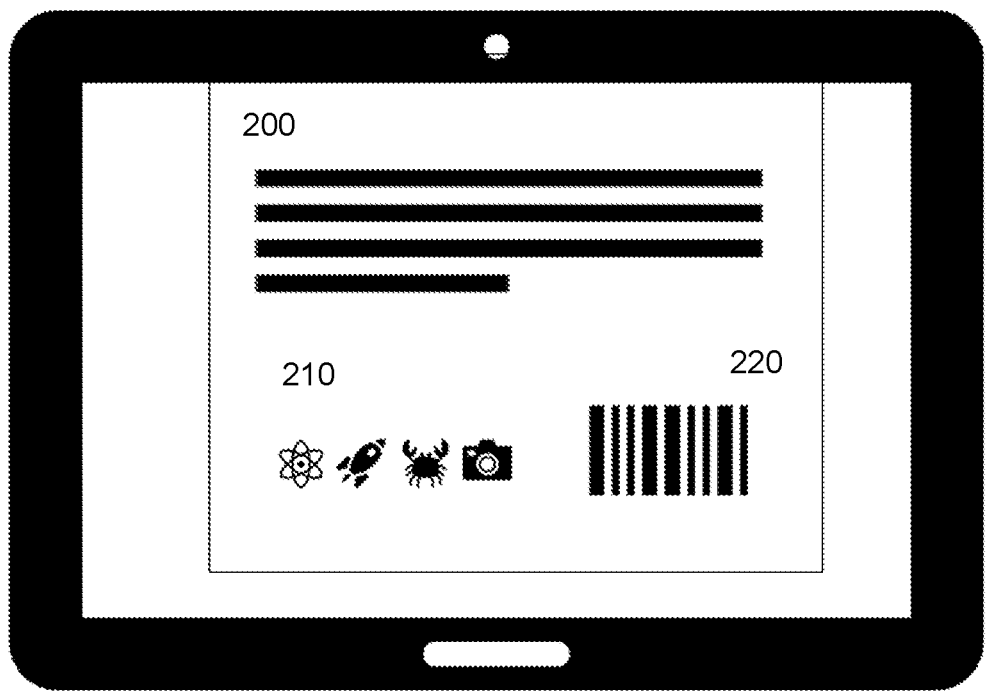
FIG. 2A illustrates an exemplary authenticable communication with an icon authentication and barcode authentication, according to some embodiments of the present disclosure.
Figure 2B:
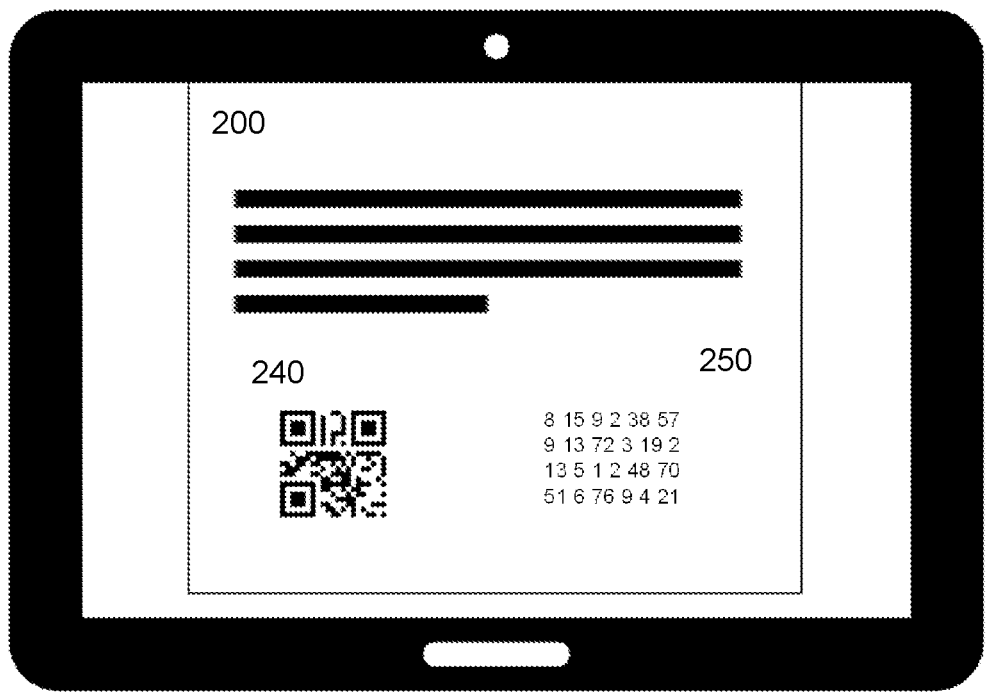
FIG. 2B illustrates an exemplary authenticable communication with a QR code authentication and a numeric grid, according to some embodiments of the present disclosure.

Referring now to FIG. 2A, an exemplary authenticable communication 200 with an icon authentication 210 and barcode authentication 220, is illustrated. Referring now to FIG. 2B, an exemplary authenticable communication 200 with a QR code authentication 240 and a numeric grid 250, is illustrated. In some aspects, the authenticable communication 200 may comprise a phone number that a recipient may call to confirm that the indicated sender is the actual sender. As part of the authentication, the phone number may connect the recipient to an authentication system. The authentication system may be automated, personal, or combinations thereof. The authentication system may confirm at least a portion of the authentication, such as for the icon authentication 210 or numeric grid 250.

In some embodiments, customer service may send an authenticable communication to a customer who is calling in as a substitute for requesting for confidential information. For example, typically, customer service may request a portion of the customer's social security number, and instead, by request or as part of a standard protocol, customer service may send the authenticable communication and request that the customer provide a portion of an identifier within the authenticable communication. This may limit exchange of personal and confidential information.

In some aspects, the authenticable communication 200 may comprise a physical document, such as a letter sent through the mail. In some embodiments, an authenticable communication 200 may be scanned to read a barcode authentication 220. Depending on the indicated source, the scanning may occur through an enterprise software or through a centralized software that may process authenticable communications 200 for multiple indicated sources. For example, the IRS or a large bank may provide an internal authentication module within their existing application or website. Hosting the programming within the enterprise may increase the sense of security and confidence a recipient may have in the authentication. It may also keep the data internal without requiring exchange of personal data or secure information through external servers.

In some implementations, the authenticable communication 200 may be split into multiple communications, which may comprise combinations of digital correspondence and paper correspondence. For example, a recipient may receive a physical letter with the icon identification 210 prompting the recipient to log into their account for the contents of their authenticable communication 200, which may only be accessible once the recipient correctly inputs the requested icons from the icon identification 210. Similarly, a recipient may receive a digital email with the icon identification 210 that may prompt the recipient to log into a portal to retrieve the content of the authenticable communication. In some aspects where the authenticable communication 200 may comprise multiple parts, the parts combined may be considered the authenticable communication. In some embodiments where the authenticable communication 200 may comprise multiple parts, at least some of the separate parts may be considered separate authenticable communications, including secondary authenticable communications.

In some embodiments, the authenticable communication 200 may comprise a product label that a recipient or potential purchaser may scan to authenticate the indicated source as well as other product characteristics. For example, a recipient may want to verify whether a product is actually from the manufacturing company associated with a brand and not a knock off. As another example, a recipient may want to verify a quality of the product, such as a manufacturing origin, certifications, or general authenticity. In some aspects, actual sources may provide an authentication module or participate in a collective authentication module where recipients may authenticate authenticable communications 200.

Figure 3:
FIG. 3 illustrates an exemplary graphical user interface (GUI) for an authentication system, according to some embodiments of the present disclosure.

Referring now to FIG. 3, an exemplary graphical user interface (GUI) 300 for an authentication system is illustrated. In some aspects, the method of authentication 310 may be customizable, such as by a source, recipient, authentication application, or source enterprise, as non-limiting examples. In some embodiments, the GUI 300 may allow a source to pre-select methods of authentication 310, which may include text, image capture, email, phone call, handwriting recognition, facial recognition, or voice recognition, as non-limiting examples.

Where the source may pre-select methods of authentication 310, the source may also provide the base data for the methods of authentication 310. For example, the source may provide the best phone number or email address where the method of authentication 310 may comprise text or email. As another example, the method of authentication 310 may comprise facial recognition, and the GUI 300 may prompt facial capture to store the authenticating facial data. As another example, where the methods of authentication 310 may comprise voice or handwriting recognition, the GUI 300 may prompt input of baseline data. For voice recognition, the source may be prompted to speak a list of words or sounds, which may allow for a randomized authentication. For handwriting recognition, the source may be prompted to write a series of words or letters.

In some embodiments, the GUI 300 may be provided to a recipient or viewer, which may allow the recipient or viewer to select their preferred method of authentication 310. In some aspects, the selection of the method of authentication 310 may be pre-set as a standard for authenticable communications. In some implementations, the selection may occur for each authenticable communication. In some aspects, the methods of authentication 310 may be ranked by preference, wherein the authentication system may offer the method of authentication 310 with the highest ranking if there are multiple methods of authentication 310 offered with the authenticable communication.

As an illustrative example, a recipient may prefer text authentication, facial recognition authentication, then phone call authentication. Where an authenticable communication may provide either phone call authentication or text authentication, the authenticating system may offer the recipient only the text authentication. Where an authenticable communication may only offer handwriting authentication, the recipient may still be given the option to request the authentication based on handwriting authentication.

In some aspects, a recipient may decide to not authenticate an authenticable communication. Were the recipient to decline authentication, one or both the authenticable communication and authentication system may contain or provide a disclaimer of liability related to the content within the authenticable communication. Where the authentication system may be integrated as an add-on to a communication system, the unauthenticated communication may be highlighted or flagged as potentially fraudulent until or unless the recipient successfully authenticates the communication.

In some embodiments, a source may refuse to authenticate, or an authentication may fail. In those cases, the recipient may receive a failure notification that warns against downloading, clicking, or performing any requested action prompted by the authenticable communication. In some aspects, such as through an add-on feature to a communication application, a failed authentication may cause a cautionary step, such as automatically deleting, blurring, or disabling the authenticable communication. In some implementations, such as where the authentication is controlled by an enterprise, a failure may further prompt reporting the failure to a regulating body, such as to an IT department, compliance department, or to the authentication system, as non-limiting examples. The reporting may flag one or more the type of authenticable communication, the authenticable communication, or indicated source of the authenticable communication as potentially fraudulent.

For example, an enterprise source may be an indicated source for a mass distribution authenticable communication. As authentications fail for the authenticable communication, a reporting may allow the enterprise to take precautionary steps to limit any damage caused by the fraudulent communication. The enterprise may send out an alert to potential recipients to ignore and delete the fraudulent communication. Where practical, the enterprise may revoke the fraudulent communication.

As another example, an individual source may be an indicated source for an authenticable communication requesting a transfer of funds to a specific account through an included link. A failed authentication may alert the individual that their systems may have been corrupted, hacked, or compromised in some way. The individual may be able to store the fraudulent communication with their profile as a mechanism to potentially identify patterns of fraud. For example, if a second authentication fails with the same content, the authentication system may be able to identify a pattern, which may allow for a better understanding of the fraudulent communication.

In some aspects, the authentication system may link or share fraud data between users, which may allow for the anticipation of fraudulent communications. For example, the authentication system may identify an enterprise phishing scam email. One or both the language and the actual source may be stored and flagged, wherein similar emails received from different enterprises or users may be more easily identified as fraud. In some embodiments, the authentication system may be accessed through a subscription model, such as by allowing a fixed number or type of authentication.

Figure 4:
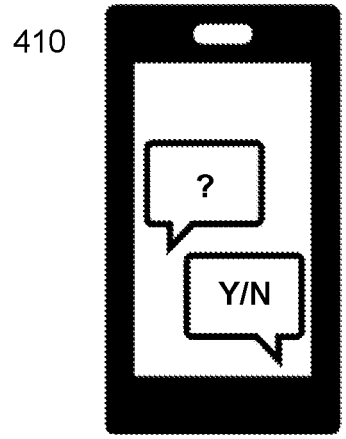
FIG. 4 illustrates exemplary authentication methods, according to some embodiments of the present disclosure.
Figure 4:
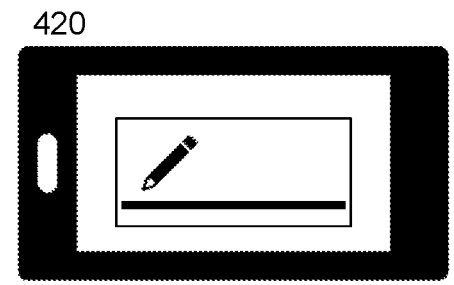
Figure 4:
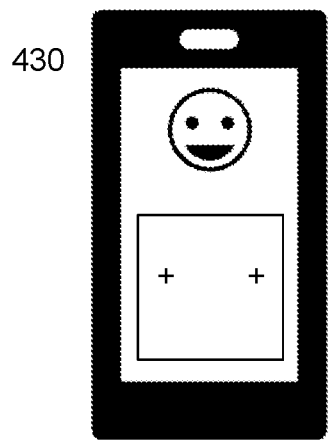
Figure 4:
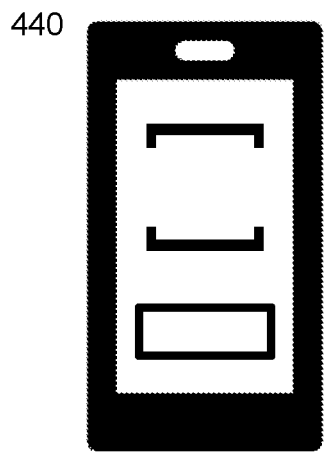
Figure 4:
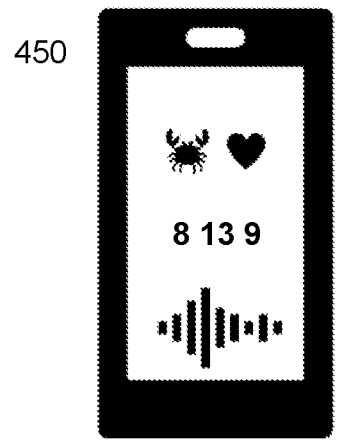

Referring now to FIG. 4, exemplary authentication methods 410, 420, 430, 440, 450 are illustrated. In some aspects, a method of authentication may depend on user settings, recipient communication settings, authenticable communication settings, source communication settings, authentication application. In some embodiments, the authentication application may comprise a separate authentication application or portal, a feature within an enterprise application, or an add-on feature within the communication system.

In some implementations, authenticable communication may require multiple levels of authentication. In some aspects, one or more of: a source, recipient, or platform may set the number and types of authentication. In some embodiments, there may be a default authentication method, such as a handwriting recognition 420, bar code recognition 440, text authentication 410, or voice recognition, wherein the authentication data may be stored with a source profile. In some implementations, a recipient may request a separate type of authentication, which may or may not be verified or stored with the source profile. For example, a recipient may request a facial recognition snapshot 430, which may allow the recipient to confirm the source independently. Randomized or custom authentication requests may provide a further layer of protection against fraud.

In some aspects, an authenticable communication may require a multi-layered authentication 450, such as requiring an icon selection, numeric matching, and voice recognition. A multi-layered authentication 450 may provide increased security against fraud. For example, a multi-layered authentication 450 may be useful where the authenticable communication may be requesting a financial transaction, social security number, or other action related to confidential information or finance.

Figure 5A:
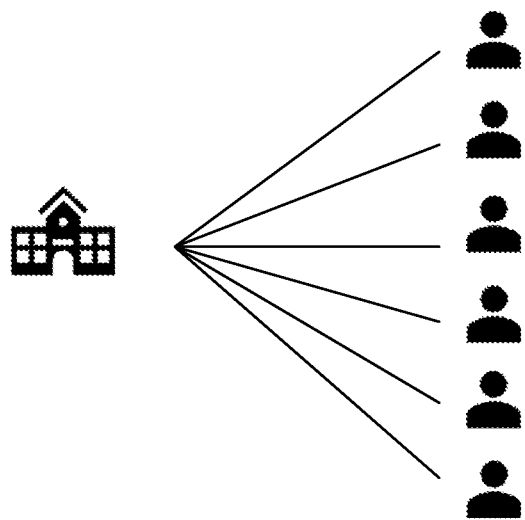
FIG. 5A illustrates an exemplary transmission of electronic communication from an enterprise source to external recipients, according to some embodiments of the present disclosure.
Figure 5B:
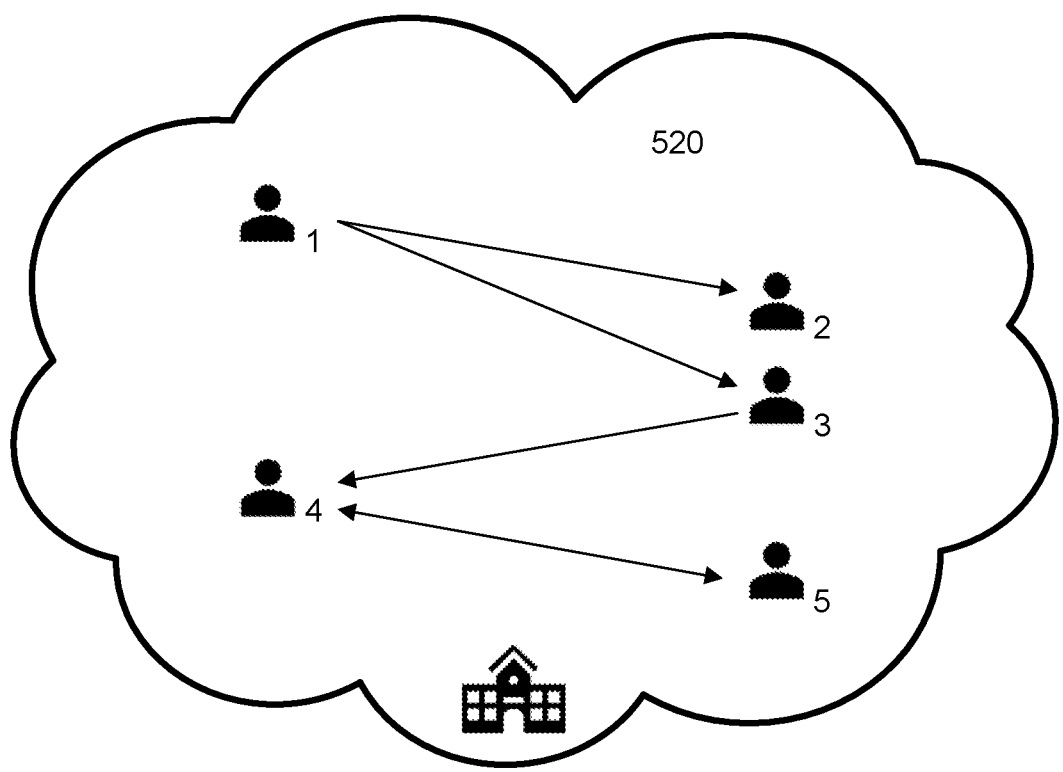
FIG. 5B illustrates an exemplary transmission of electronic communication between sources and recipients within an enterprise, according to some embodiments of the present disclosure.

Referring now to FIG. 5A, an exemplary transmission of electronic communication from an enterprise source 510 to external recipients is illustrated. Referring now to FIG. 5B, an exemplary transmission of electronic communication between sources and recipients within an enterprise 520. In some aspects, electronic communication from an enterprise source 510 may be sent to multiple recipients, wherein the recipients may want to know whether the communication is from the enterprise source 510 and not necessarily the person who may have sent it. In some embodiments, the source in communications within an enterprise 520 may be individuals, such as employees. In some implementations, the source within an enterprise may comprise departments, such as from human resources or compliance.

In some embodiments, communications within an enterprise 520 may have hierarchies of authentication. For example, a low-level employee may never send authenticable communication as their communications may never contain secure information, and each of their communications may be marked as non-authenticable, which may provide sufficient warning to any recipients that their communications should not contain confidential information. A manager may periodically send confidential information and may designate authenticable communication based on the contents of each communication. Employees from the human resources department may only send authenticable communications because all or most of their communications may relate to confidential or personal data. Employees from the finance department may only receive authenticable communications internally, which may limit the effectiveness of fraudulent internal instructions.

In some aspects, the authentication may occur on the backend of the communication exchange, wherein the sources may not be required to take an additional step to authenticate a communication. In some implementations, the authentication may occur through a third party, such as through a call center, an authentication system, or controlling department, as non-limiting examples. For example, the IT department may be responsible for authentications. In some embodiments, failed authentications may prompt further action, such as investigation, blocking of the indicated source, or blocking of the actual source, as non-limiting examples. Blocking the indicated source may be temporary until the cause of the breach is further understood.

In some embodiments, the authentication may occur one way or two way. For one-way authentication, only the source may be authenticated, and for two-way authentication, both the source and the recipient may be authenticated. Two-way authentication may be useful to confirm the correct person received the authenticable communication. Further, two-way communication may allow for the open exchange of communications where the recipient may reply to the authenticable communication and become the indicated source of the reply.

For example, a health care provider may transmit a document with information protected by HIPAA to a patient. It may be helpful or required to stay compliant to verify both the source and the recipient, which may occur automatically, manually, or a combination. A source authentication may occur automatically once the authenticable communication is transmitted, and the recipient authentication may be initiated by opening the authenticable communication. At least a portion of the contents of the authenticable communication, such as the personal or confidential material, may be obscured or blocked to the recipient until both the source and recipient are authenticated.

Figure 6:
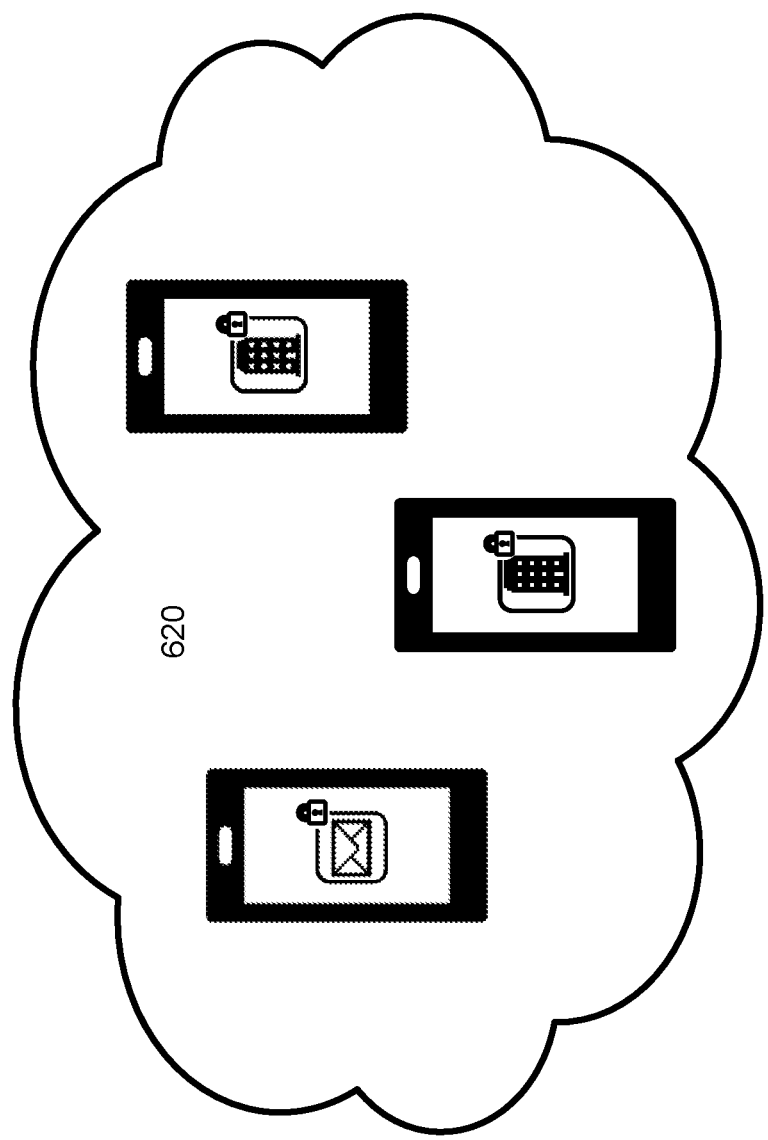
FIG. 6 illustrates an exemplary transmission of authenticable communication from an enterprise source 610 to external recipients, according to some embodiments of the present disclosure.
Figure 6:
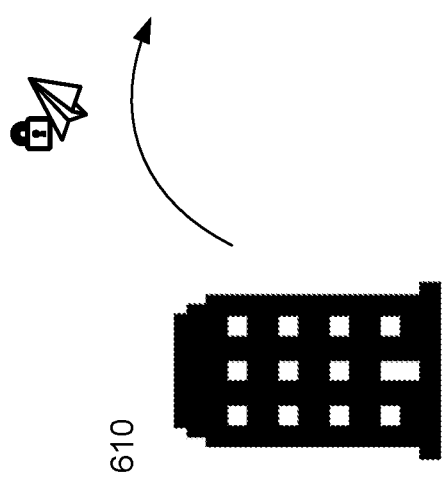

Referring now to FIG. 6, an exemplary transmission of authenticable communication from an enterprise source 610 to external recipients 620 is illustrated. In some aspects, some of the recipients may have an enterprise application on their portable device, such as a smartphone or tablet. Where the recipient may have the enterprise application, the transmission of authenticable communication may be directly through the enterprise application. In some embodiments, some of the recipients may only receive authenticable communication through a secondary communication source, such as an email application. Where the recipient may not have the enterprise application, the authenticable communication may be sent through a non-enterprise application.

In some aspects, such as where the authenticable communication may be sent through an enterprise application, the authentication methods may be less stringent than those sent through a third-party application. For example, source authentication for enterprise application authenticable communications may comprise a single authentication method that may be internal to the enterprise application, and source authentication for external authenticable communications may comprise multiple authentication methods that may require an affirmative authentication request.

Figure 7:
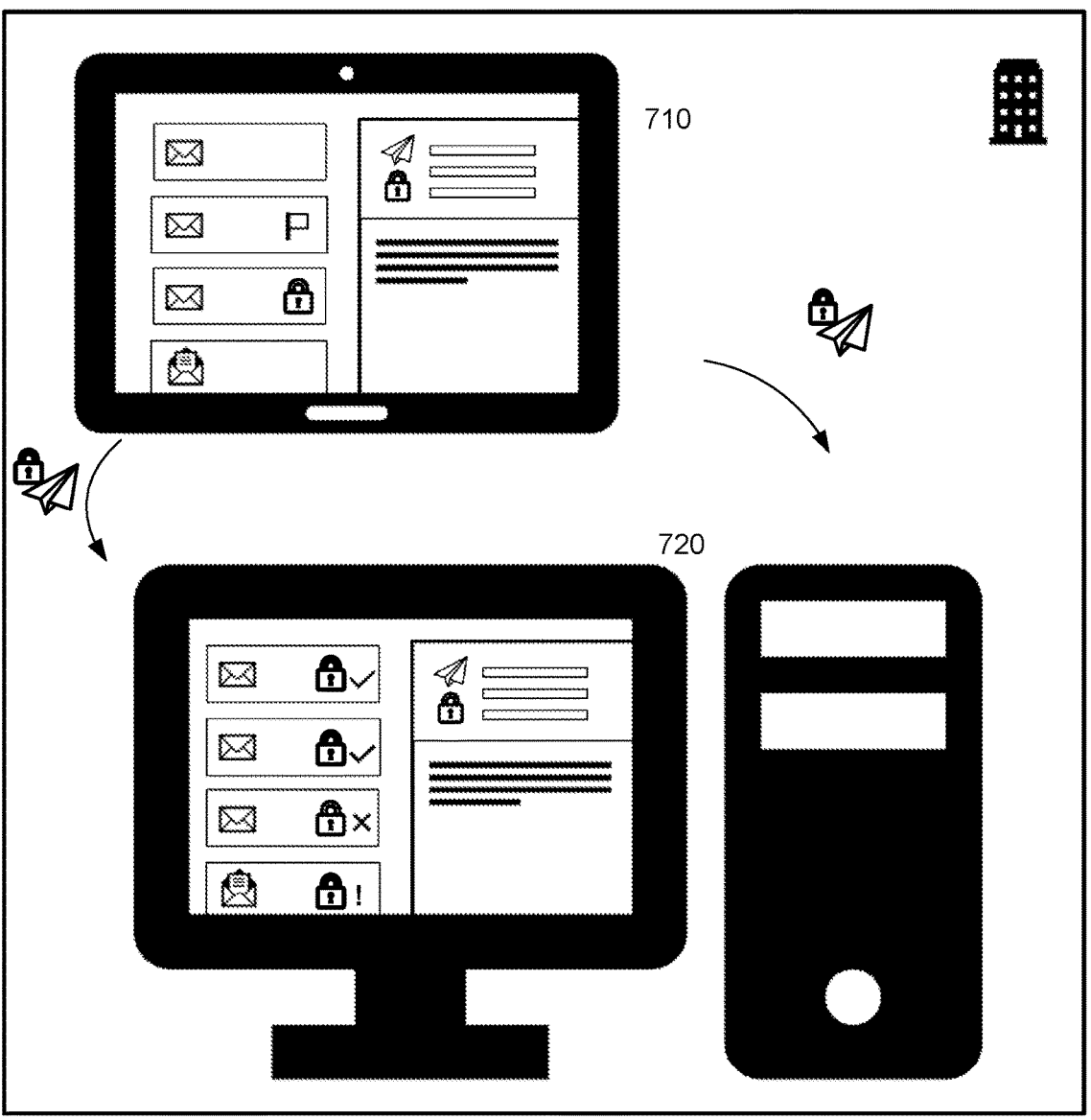
FIG. 7 illustrates exemplary authenticable communication exchanges, according to some embodiments of the present disclosure.

Referring now to FIG. 7, exemplary authenticable communication exchanges are illustrated. In some aspects, sources of authenticable communication may comprise employees within an enterprise 700. In some embodiments, a first employee 710 may exchange authenticable communications with a second employee 720. In some implementations, the indicated source may comprise an enterprise, wherein the authenticable communication may be external communications between external recipients and one or more within the enterprise, 700 and the employees 710, 720.

In some aspects, employees may have a set of permissions and email requirements. Some may be required to use secure mail for both incoming and outgoing, such as an employee responsible for the exchange of personal, private, confidential, or financial information. In some aspects, some mail types may be authenticable communication, such as those containing personal, private, confidential, or financial information. In some embodiments, the source may identify the content or mail type, which may determine whether a communication is authenticable or not. In some implementations, the source may actively flag a communication as authenticable, such as when the source wants to alert the recipient that the contents need to be authenticated. Internal emails may automatically be checked, such as through the enterprise communication infrastructure.

Figure 8:
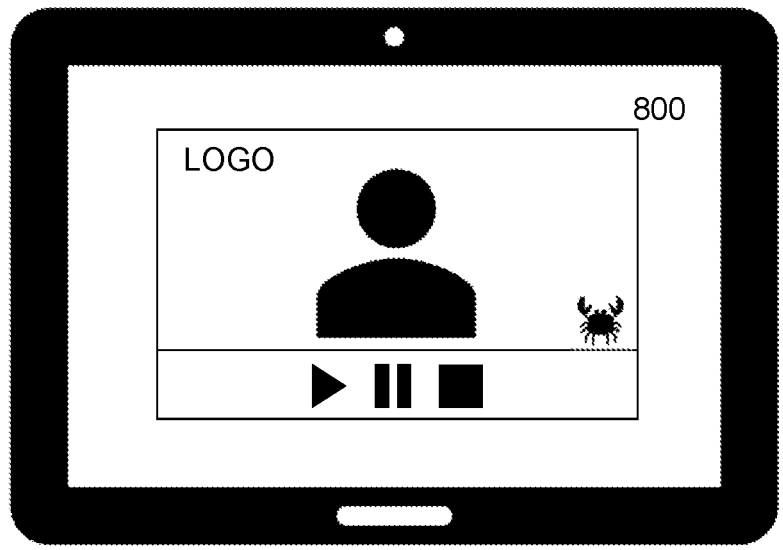
FIG. 8 illustrates an exemplary authenticable communication, wherein the authenticable communication may comprise a video.

Referring now to FIG. 8, an exemplary authenticable communication 800 is illustrated, wherein the authenticable communication 800 may be generated from an electronic communication comprising original content that at least partially comprises one or more types of text or media, such as, for example and not limitation, at least one video, image, article, or sound recording, as non-limiting examples. In some aspects, the authenticable communication 800 may comprise at least one authentication mechanism that comprises at least one detectable element, such as, for example and not limitation, a logo; a watermark; a quick-response or "QR" code; a numeric grid; a grouping of one or more letters, characters, words, or phrases; syntax; a grouping of one or more pixels; an audio sound; an audio cue; a dialect; a tone; or any similar aspect associated with or that may be integrated with or embedded within one or more portions of an electronic communication, such as, for example and not limitation, the original content thereof.

In some implementations, the authentication mechanism may be at least temporarily stored in at least one memory resource, such as, for example and not limitation, a database or hard drive. In some embodiments, the authentication mechanism may comprise a correlation formed or established between the detectable element and a primary data transmission pathway of a first electronic communication and/or the actual source of the first electronic communication such that upon subsequent detection of the detectable element within a second electronic communication, a determination may be made whether the second electronic communication comprises the actual source and/or the primary data transmission pathway, wherein a negative determination for one or both of these aspects may indicate that the second electronic communication may comprise fraudulent, unauthorized, incomplete, misleading, or inaccurate content that comprises a replication of at least a portion of the original content of the first electronic communication.

In some embodiments, an actual source of the authenticable communication 800 may want to provide an authentication method for the authenticable communication 800 so that one or more of a plurality of potential viewers or other recipients of the authenticable communication 800 may have confidence that the indicated source of the media or other content of the authenticable communication 800 comprises the actual source thereof. In some implementations, this may detract from any legitimacy that may be associated with fake videos or other types of counterfeit or imitated media that may be incorrectly associated with an actual source.

In some aspects, the authentication method may at least partially comprise integrating or embedding one or more detectable elements in the form of identification icons or similar visual representations with within at least one portion of an authenticable communication 800, such as, for example and not limitation, in the form of media, that may be associated with the actual source of the authenticable communication 800 such that the visual representation may be displayed with the authenticable communication 800. In some implementations, the visual representation may be correlated to the actual source of the authenticable communication 800 or the primary data transmission pathway of the authenticable communication 800 such that the presence of the visual representation or other detectable element may be subsequently detected within an authenticable communication 800 to authenticate the authenticable communication 800. By way of example and not limitation, one or more identification icons may be configured at a corner of content of an authenticable communication 800 comprising a video at one or more predetermined, preset, or expected time stamps. In some non-limiting exemplary implementations, by correlating one or more identification icons with an actual source and/or a primary data transmission pathway of an authenticable communication 800, the authentication system or one or more users thereof may confirm or verify that the content of the authenticable communication 800 was transmitted by or with the consent or authorization of the actual source.

In some non-limiting exemplary embodiments, the authenticable communication 800 may be at least partially generated and/or transmitted via at least one authentication system. In some implementations, the authentication system may provide an actual source of one or more electronic communications with the ability to register an electronic communication before transmitting it to one or more recipients, such as, for example and not limitation, one or more potential viewers of the electronic communication. In some aspects, registration of the electronic communication may at least partially comprise generating, embedding, integrating, or otherwise associating at least one authentication mechanism with the electronic communication to convert the electronic communication to an authenticable communication 800. In some embodiments, the electronic communication may be converted to an authenticable communication 800 without first being registered. In some implementations, the authentication system may provide a public authentication portal for the authenticable communication 800, which may allow one or more viewers or other recipients of an electronic communication that comprises one or more detectable elements correlating to one or more aspects of the authenticable communication 800 to submit at least one request to authenticate the electronic communication, such as, for example and not limitation, using the authentication mechanism associated therewith.

In some embodiments, the authentication mechanism of the authenticable communication 800 may be configured to confirm, verify, or authenticate a primary data transmission pathway of the authenticable communication 800, wherein the primary data transmission pathway of the authenticable communication 800 may comprise original content transmitted from an actual source of the authenticable communication 800. In some implementations, the primary data transmission pathway of the authenticable communication 800 may comprise at least one data transmission pathway associated with or used during a first or initial transmission of the authenticable communication 800 from the actual source to a one or more of a plurality of potential recipients, or upon the registration of the authenticable communication 800 within at least one authentication system. In some aspects, a potential recipient of the authenticable communication 800 may comprise any user who may have the capability and/or permission to access, view, or otherwise receive the authenticable communication 800, while a recipient of the authenticable communication 800 may comprise any user who actually accesses, views, or otherwise receives the authenticable communication 800.

By way of example and not limitation, a primary data transmission pathway of an authenticable communication 800 may comprise a media post or livestream on a social media site, a blog or article on a website or webpage, or content generated and/or presented within a gaming or virtual reality environment (such as, for example and not limitation, the metaverse), as non-limiting examples. In some aspects, the primary data transmission pathway of the authenticable communication 800 may be reproduced such that the primary data transmission pathway may comprise an indefinite number of access or transmission occurrences, such as, for example and not limitation, when a website or social media post may be visited or viewed a plurality of times. In some implementations, the primary data transmission pathway of the authenticable communication 800 may comprise at least one repeatedly accessible data transmission pathway from at least one storage medium, such as, for example and not limitation, a webpage or social media post that may be downloaded a plurality of times from at least one server by one or more recipients via one or more client or local computing devices.

In some aspects, a transmission of an electronic communication that does not comprise the primary transmission may comprise a secondary data transmission pathway. In some embodiments, an electronic communication that comprises a secondary data transmission pathway may originate from at least one indicated source. In some implementations, such as, for example and not limitation, when the same source posts a blog article on a website and a social media page, the indicated source of the electronic communication comprising the secondary data transmission pathway may be the same as the actual source of the authenticable communication 800 comprising the primary data transmission pathway. In some aspects, the indicated source of one or more electronic communications comprising a secondary data transmission pathway may be different from the actual source of the authenticable communication 800.

In some non-limiting exemplary embodiments, the authentication mechanism of an authenticable communication 800 comprising a detectable element may be configured to initiate or facilitate a determination of whether a received transmission of an electronic communication comprising the detectable element comprises a primary data transmission pathway or a secondary data transmission, wherein one or more results of such determination may be presented to at least one recipient of the electronic communication or to the actual source of the authenticable communication 800. By way of example and not limitation, such determination may at least partially comprise determining whether the current data transmission pathway of the electronic communication is the same as the primary data transmission of the authenticable communication 800, wherein the primary data transmission pathway of the authenticable communication 800 may be identified by the authentication mechanism, such as by referencing data stored in at least one memory resource, as a non-limiting example.

In some non-limiting exemplary implementations wherein the authentication mechanism of an authenticable communication 800 may facilitate a determination that an electronic communication comprising the detectable element of the authenticable communication 800 comprises a secondary data transmission pathway, the content of the electronic communication comprising the secondary data transmission pathway may comprise replicated content, wherein one or more portions of the replicated content of the electronic communication may be the same or different as one or more portions of the original content of the authenticable communication 800 comprising the primary data transmission pathway.

In some embodiments, upon a determination that an electronic communication comprises a secondary data transmission pathway, the authentication system associated with the authentication mechanism of the authenticable communication 800 may be configured to initiate or facilitate at least one comparison between at least one portion of the replicated content of the electronic communication with at least one portion of the original content of the authenticable communication 800, wherein such comparison may enable the authentication system to determine or identify one or more differences between the replicated content and the original content, or to initiate or facilitate at least one comparison between the indicated source of the electronic communication and the actual source of the authenticable communication 800. In some aspects, the comparison may be automatically initiated by the authentication system when the relevant transmission of the a electronic communication is determined to comprise a secondary data transmission pathway, or the comparison may be initiated via a request received from at least one recipient of the electronic communication, the actual source of the authenticable communication 800, or any other user of the authentication system, regardless of whether the transmission comprises a primary or secondary data transmission pathway. By way of example and not limitation, at least one difference between the original content and the replicated content may comprise a difference in one or more of: a playback time duration, a presentation time duration, at least one audio characteristic, or at least one visual characteristic, as non-limiting examples.

As a non-limiting illustrative example, in some aspects wherein the original content of an authenticable communication 800 comprising a primary data transmission pathway may comprise media in the form of a live or previously-recorded media playback that comprises audio and video components, the authentication system associated with the authentication mechanism of the authenticable communication 800 may compare the original video content with replicated video content as of an electronic communication comprising a secondary data transmission pathway to determine that the replicated content comprises a video that is five seconds shorter than the original video content and comprises audio and visual characteristics that have been modified, enhanced, or generated by one or more artificial intelligence ("AI") algorithms.

In some non-limiting exemplary implementations, the authentication system associated with the authenticable communication 800 may be configured to compute, calculate, or otherwise determine at least one quantified representation of one or more results of a comparison between the original content of the authenticable communication 800 and the replicated content of an electronic communication. In some aspects, the quantified representation may comprise one or more of: a score, a percentage, a graph, a chart, or similar indicator of a degree of similarity or difference between the original content and the replicated content, wherein the quantified representation may be presented to at least one user of the authentication system, such as, for example and not limitation, via at least one graphical user interface displayed via at least one display screen or monitor integrated with or communicatively coupled to at least one computing device. In some embodiments, the quantified representation may be presented to the actual source of the authenticable communication 800 or one or more recipients of the electronic communication. In some aspects, the authentication system may be configured to notify the actual source or the recipient(s) of an electronic communication to be notified when an electronic communication comprising one or more detectable elements associated with an authenticable communication 800 may comprise replicated content that differs from the original content of the authenticable communication 800 and/or whether the indicated source of the electronic communication differs from the actual source of the authenticable communication 800.

As a non-limiting illustrative example, the authentication system may be able to determine that the replicated content of a secondary transmission of an electronic communication comprising a secondary data transmission pathway is 75% similar to the original content of the relevant authenticable communication 800, wherein the results of such determination may be presented to at least one user of the authentication system. In some non-limiting exemplary embodiments, the authentication system may be configured to identify or determine one or more differences between the original content and the replicated content and present a list, summary, description, visual representation, or similar informative notification of such differences to one or more users of the authentication system.

In some implementations wherein a user of the authentication system may view, access, or otherwise receive an electronic communication comprising a secondary data transmission pathway, the authentication system may be configured to automatically notify or otherwise indicate to the user that the electronic communication comprises replicated content that may be at least partially different from the original content of the relevant authenticable communication 800 comprising one or more detectable elements that may also be present in the electronic communication comprising the secondary data transmission pathway. In some embodiments, the authentication system may initiate, either automatically or at the request of the user, the simultaneous presentation of the original content and the replicated content of the authenticable communication 800 and the electronic communication, respectively, such as, for example and not limitation, in a side-by-side format for comparison, so that the user may inspect the original content and the replicated to identify one or more differences therebetween. In some aspects, the authentication system may be configured to indicate or identify one or more aspects or characteristics of the replicated content that may be different from the original content, such as, for example and not limitation, by highlighting, bordering, or otherwise emphasizing or drawing the user's attention to the suspicious, uncertain, or questionable portions of the replicated content. In some implementations, the potentially different characteristics of the replicated content may be emphasized without simultaneously presenting the original content. In some aspects, a difference in the overall intent or meaning of the replicated content compared to the original content may be identified or determined by the authentication system.

In some embodiments, the authentication system associated with an authenticable communication 800 may be configured to notify the actual source of the authenticable communication 800 any time the detectable element(s) of the authentication mechanism are detected within an electronic communication comprising a secondary data transmission pathway. In some aspects, this may allow the actual source of the authenticable communication 800 to monitor any electronic communications that may comprise replicated content and stop, cease, discontinue, or otherwise terminate any unapproved or unauthorized reproduction(s) of the original content of the authenticable communication 800. In some embodiments, the authentication system may be configured to inform or direct the actual source of the authenticable communication 800 of or to the secondary transmission pathway comprising the electronic communication comprising replicated content so that the actual source may view and assess the replicated content and become aware of where the replicated content is posted or otherwise made available. In some non-limiting exemplary implementations, any recipient or other user who attempts to view, access, or otherwise receive an electronic communication comprising one or more detectable elements of an authenticable communication 800 may be redirected, via a generated and provided link or upon automatic initiation from the authentication mechanism, to the authenticatable communication 800. In some aspects, this may increase the likelihood that the user views, accesses, or otherwise receives the original content of the authenticable communication 800 instead of replicated content, and may also enable the actual source of the authenticable communication 800 to be correctly identified.

As a non-limiting illustrative example, an authenticable communication 800 may comprise a blog article, and the primary data transmission pathway of the authenticable communication 800 may comprise a webpage associated with the actual source of the article. In some aspects, an indicated source different from the actual source may repost the article without permission on a social media site, wherein the social media site posting may comprise an electronic communication comprising a secondary data transmission pathway. In some implementations, the authentication system of the authenticable communication 800 may be configured to automatically redirect any recipient who receives the blog article on a social media site to the webpage of the actual source of the article while, in some embodiments, simultaneously or subsequently notifying the actual source of the unauthorized reposting of the article. In some aspects, this may allow the actual source of the blog article to be credited with providing or generating the article, as well as enable the actual source to take down or otherwise terminate the reposted blog article on the social media site. This may be useful, for example and not limitation, when the electronic communication comprising the secondary data transmission pathway may comprise replicated content that differs at least partially from the original content of the authenticable communication 800, which may cause confusion or misunderstandings for recipients.

In some implementations, the authenticable communication 800 may comprise at least one authentication mechanism in the form of at least one verifiable token that may allow the authenticable communication 800 to be authenticated any time it may be accessed, viewed, or otherwise received, whether via a primary or secondary data transmission pathway. In some non-limiting exemplary embodiments, the authentication mechanism may be configured to be implemented or otherwise used independently of an authenticable communication 800, wherein the authentication mechanism may be configured to perform one or more authentication assessments on at least one portion of any electronic communication comprising any content from any source. By way of example and not limitation, the authentication mechanism may be configured to determine if one or more portions of the content of an electronic communication were at least partially generated by one or more AI or machine learning algorithms, such as, for example and not limitation, a natural language processing tool.

As a non-limiting illustrative example, an authentication mechanism may be configured to be executed on content that at least partially comprises a video format. In some aspects, the authentication mechanism may analyze one or more audio or visual characteristics of the video to determine whether at least a portion of the video was at least partially generated, edited, enhanced, augmented, or otherwise manipulated by one or more AI, machine learning, or other computer algorithms such that the video may comprise a "deepfake" that may be misleading to one or more recipients of the video.

In some implementations, an authentication system associated with an authenticable communication 800 comprising one or more detectable elements may be configured to determine whether an indicated source of an electronic communication comprising the detectable element(s) is the same as the actual source of the authenticable communication 800. In some non-limiting exemplary embodiments, the actual source of the authenticable communication 800 may comprise one or more machine learning, artificial intelligence, or similar computer algorithms. In some aspects, original content produced or generated by computer algorithms may comprise unique wording or syntax that may be indicative of the computer algorithms, and such wording or syntax may comprise at least a portion of the detectable elements of the authenticable communication. In some non-limiting exemplary implementations, the authentication system may be configured to analyze the original content produced or generated by an actual source comprising one or more computer algorithms such that the authentication system may determine one or more inputs that likely facilitated generation of the content.

In some aspects, upon a determination of the inputs, the authentication system may be configured to assess, analyze, or determine whether the original content generated by the computer algorithms comprises content typically associated with such inputs, such as, for example and not limitation, by referring to data in at least one database comprising one or more correlations between one or more inputs and one or more types of corresponding content generated by computer algorithms.

In some aspects, an authenticable communication 800 may comprise a live feed between at least one indicated source and at least one recipient, such as, for example and not limitation, for telemedicine, online gaming, teleconferencing, or distance education, as non-limiting examples. Where the authenticable communication 800 may be live and ongoing, authentication via at least one authentication mechanism may occur in substantially real time and/or may be periodic or otherwise recurring to ensure that each indicated source continues to be an actual source. By way of example and not limitation, an authentication system may periodically prompt a viewer or other recipient to input an authenticating mark displayed on a portion of a video or may prompt an indicated source to be periodically authenticated as an actual source. As another non-limiting example, each participant of a conference call may be considered an actual source, wherein each participate may authenticate their presence, such as through text, telephone number, email, or voice recognition, as non-limiting examples at one or more tunes during the call. In some aspects, participation in a teleconference call may be prohibited unless and until each actual source is authenticated. Where the authentication may occur periodically during the teleconference, a participant may be kicked out or otherwise removed from the teleconference if an authentication fails.

As a non-limiting illustrative example, a viewer or other recipient may access an authentication portal via an authentication system website, an actual source website, or a third-party website, such as, for example and not limitation, the authenticable communication 800 platform. In some aspects, the recipient may input at least one identifier for the authenticable communication 800 via the authentication portal, such as, for example and not limitation, a title or label. In some implementations, the portal may be configured to immediately determine and report that the authenticable communication 800 is not associated with the actual source thereof. In some embodiments, the portal may further prompt the recipient to input an authentication mechanism, such as one or more icons displayed at one or more predetermined time stamps associated with content of the authenticable communication 800. In some aspects, the time stamp requests may be randomly generated, which may further limit false positives.

In some implementations, the authentication portal may facilitate collaboration between two or more users of the authentication system. By way of example and not limitation, a user may use the authentication portal to submit a request to an actual source of an authenticable communication 800 for authorization or approval to instigate or initiate at least one transmission of at least one electronic communication comprising replicated content that is at least partially similar to the original content of the authenticable communication 800. As a non-limiting illustrative example, a user may use the authentication portal to submit a request to an actual source of a blog on a website to repost the blog on the user's social media page or to initiate the formation of at least one licensing agreement, as non-limiting examples.

In some non-limiting exemplary implementations, two or more users may use the authentication portal to collaborate to generate content for a primary transmission of an authenticable communication 800 such that a plurality of users may collectively comprise an actual source of the authenticable communication 800, or the authenticable communication 800 may comprise a plurality of actual sources. As a non-limiting illustrative example, a plurality of freelance journalists may use the authentication portal to create a video and write an article about a local sporting event, wherein the video and article may be presented together as content for an online publication of a local newspaper.

Figure 9:
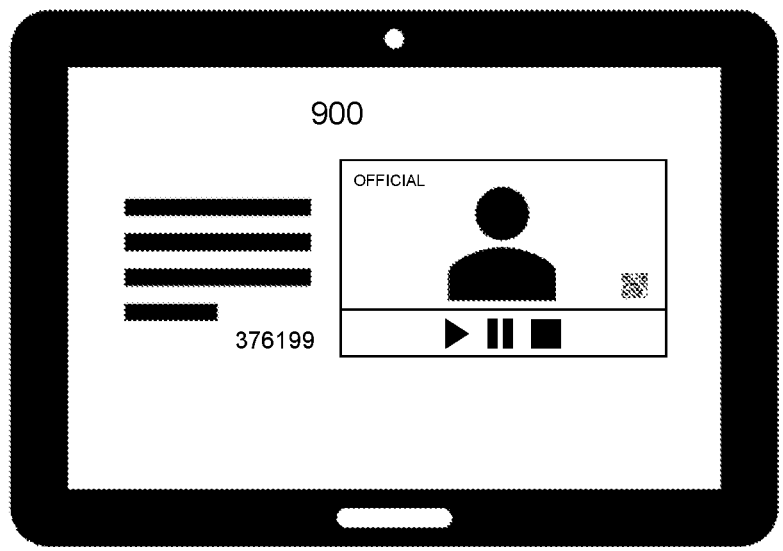
FIG. 9 illustrates an exemplary authenticable communication, wherein the authenticable communication may comprise an article with an embedded video.

Referring now to FIG. 9, an exemplary authenticable communication 900 is illustrated, wherein the authenticable communication 900 may comprise an article with an embedded video. In some aspects, one or both the article and the embedded video may each be associated with an indicated source, which may be the same or different. For example, and not limitation, the video may be from a news source, and the article may be independently written by an individual commenting on the material of the video but not associated with the news source.

As another non-limiting example, the embedded video may comprise an advertisement that may be separate from the article. In some aspects, multiple authenticable communications 900 may be contained within the same page, interface, or document. Where the authenticable communication 900 may comprise a plurality of independent indicated sources, each portion of the authenticable communication 900 associated with a unique independent indicated source may be independently authenticated. By way of example and not limitation, a viewer or other recipient of the authenticable communication 900 may desire to authenticate the article and may not care to authenticate the advertisement, as the viewer may not be interested in interacting with the ad. As another non-limiting example, an ad may appear to be associated with the article, so a viewer may want to authenticate only the embedded video to determine whether it is an advertisement or if it is pertinent to the article.

In some aspects wherein one or more of a plurality of indicated sources of an authenticable communication 900 may be different, each portion of the authenticable communication 900 may comprise separate source authentications. In some implementations, each indicated source may comprise a unique authentication process, such as through a phone call, authentication portal, or other authentication mechanism. In some embodiments, each indicated source may be authenticated through the same authentication system, which may allow for layered authentication.

As a non-limiting illustrative example, an article may comprise a dual-layered authenticatable communication 900. In some aspects, a viewer may access the authentication method, input an authenticable communication identifier, such as a domain, title, or tag, and provide two authentication requests. In some implementations, one request may be through the content of the article, and the other request may be acquired through navigating the embedded. In some embodiments, the indicated source of each portion of the authenticable communication 900 may be separately authenticated, and the combination may also be authenticated. Authenticating the combination may provide the viewer with confidence that the authenticated article actually refers to the authenticated video.

Figure 10:
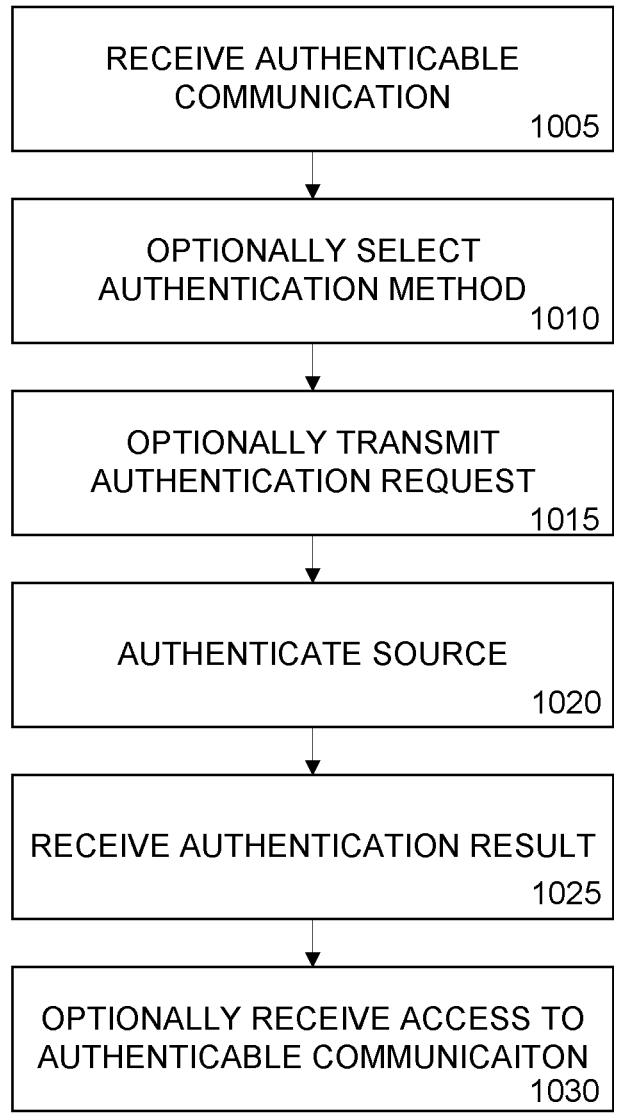
FIG. 10 illustrates exemplary method steps for requesting a source authentication, according to some embodiments of the present disclosure.

Referring now to FIG. 10, exemplary method steps for requesting a source authentication are illustrated. At 1005, an authenticable communication may be received. In some aspects, at 1010, an authentication method may be selected. In some embodiments, at 1015, an authentication request may be transmitted. At 1020, the source may be authenticated. At 1025, the authentication result may be received. In some embodiments, at 1030, access to the authenticable communication may be received. In some implementations, the steps from 1010 to 1020 may be automated on a backend, wherein a recipient may not be required to perform additional actions to initiate the authentication. In some aspects, a recipient may initiate authentication, such as through clicking an authenticate button within the communication system or by inputting authentication information into an authentication system.

In some embodiments, source authentication may be requested through a system with system protocols. For example, the authenticable communication may comprise a document sent for secure signature from a predefined person, and the source authentication may occur automatically when the executed document is received. The source authentication may confirm that the indicated source of the signer is the actual source and that the actual source matches the predefined person. In some aspects, the source authentication for an executed document may be prompted manually by a recipient trying to confirm that the predefined person actually executed the document. The source authentication may request input or scanning of a code or identifier on the document. The source authentication may prompt a secondary authenticatable communication that may be generated to ensure the indicated source of the signature is the actual source.

In some aspects, authenticable communication may comprise a point of action communication, such as a purchase of a regulated product, voting, logging into a secure Wi-Fi system, transmission of personal health data to a health provider source, scanning a ticket for entrance into a venue, purchasing a ticket, boarding transportation, or other action where confirming that the indicated source is the same as the actual source is significant. In some embodiments, authentication may be requested automatically once the action is initiated. In some aspects, authentication may be requested prior to transmission of the authenticable communication. For example, a vote in a political race may not be officially transmitted until after the authentication occurs. As another example, sale of a lottery ticket may not be fully executed and transmitted until the authentication further confirms the age of the actual source.

Figure 11:
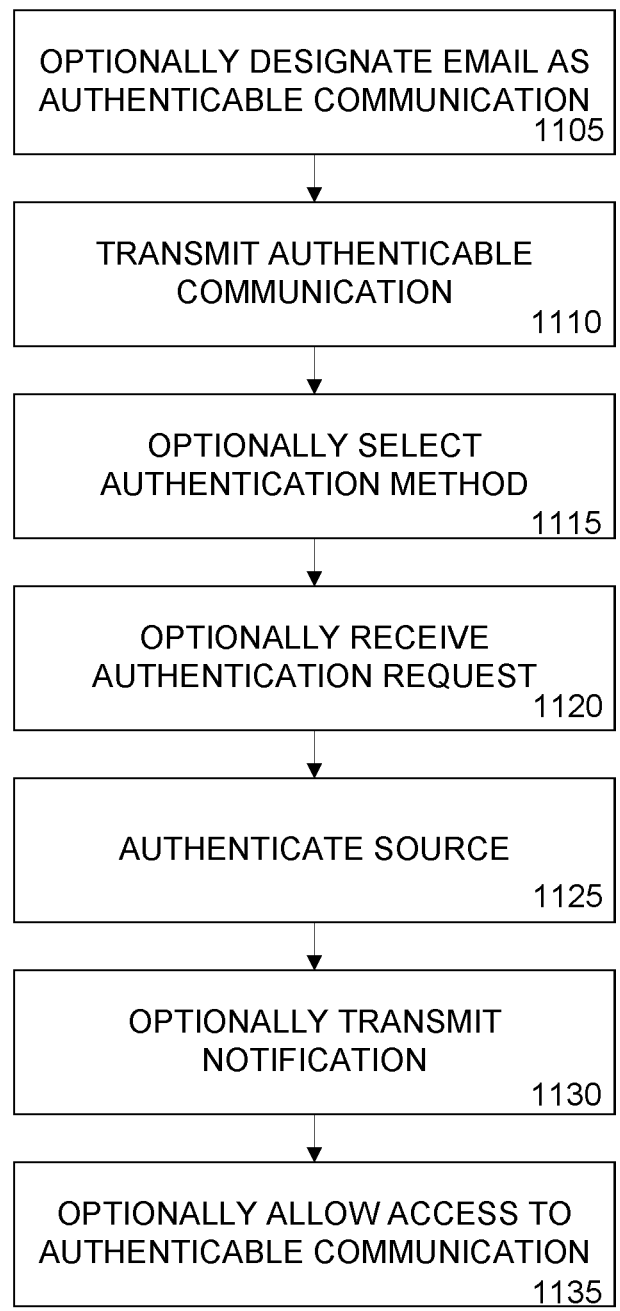
FIG. 11 illustrates exemplary method steps for transmitting an authenticable communication, according to some embodiments of the present disclosure.

Referring now to FIG. 11, exemplary method steps for transmitting an authenticable communication are illustrated. In some embodiments, at 1105, a communication may be designated as an authenticable communication. At 1110, an authenticable communication may be transmitted. In some implementations, at 1120, an authentication request may be received. At 1125, an authenticable communication may be authenticated. In some aspects, at 1130, a notification of the authentication result may be transmitted. In some embodiments, at 1135, access to the authenticable communication may be accessed. For example, wire information may be partially obscured until the source is authenticated.

Figure 12:
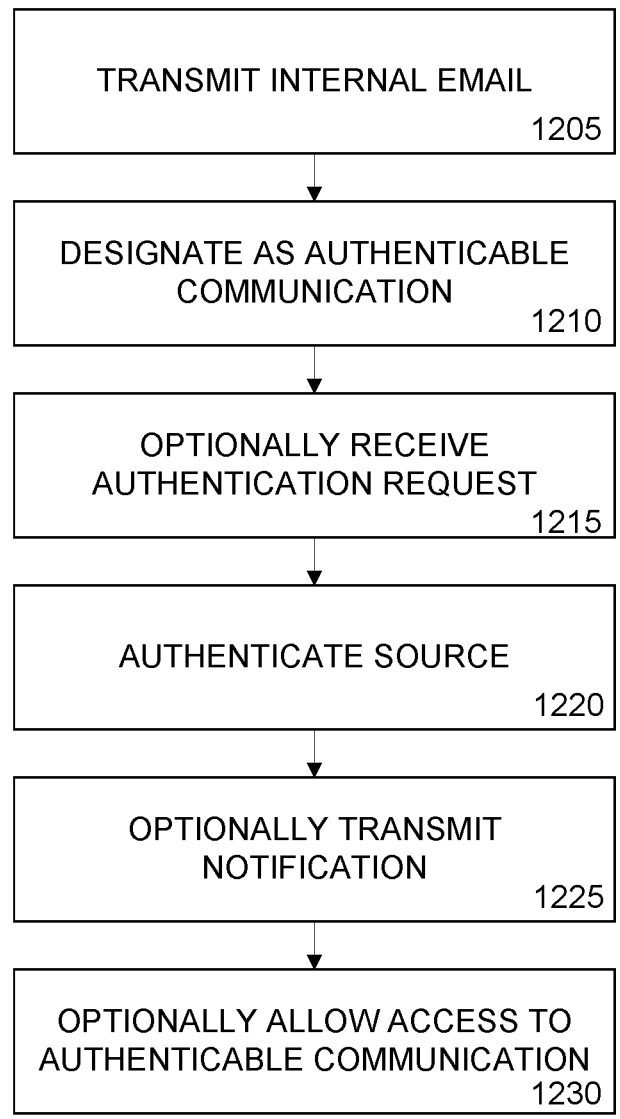
FIG. 12 illustrates exemplary method steps for transmitting an internal enterprise communication, according to some embodiments of the present disclosure.

Referring now to FIG. 12, exemplary method steps for transmitting an internal enterprise communication are illustrated. At 1205, an internal communication may be transmitted. At 1210, the internal communication may be designated as authenticable communication. In some aspects, at 1215, an authentication request may be received. At 1220, the authenticable communication may be authenticated. In some embodiments, at 1225, an authentication result may be transmitted. In some implementations, at 1230, access to the authenticable communication may be allowed.

Figure 13:
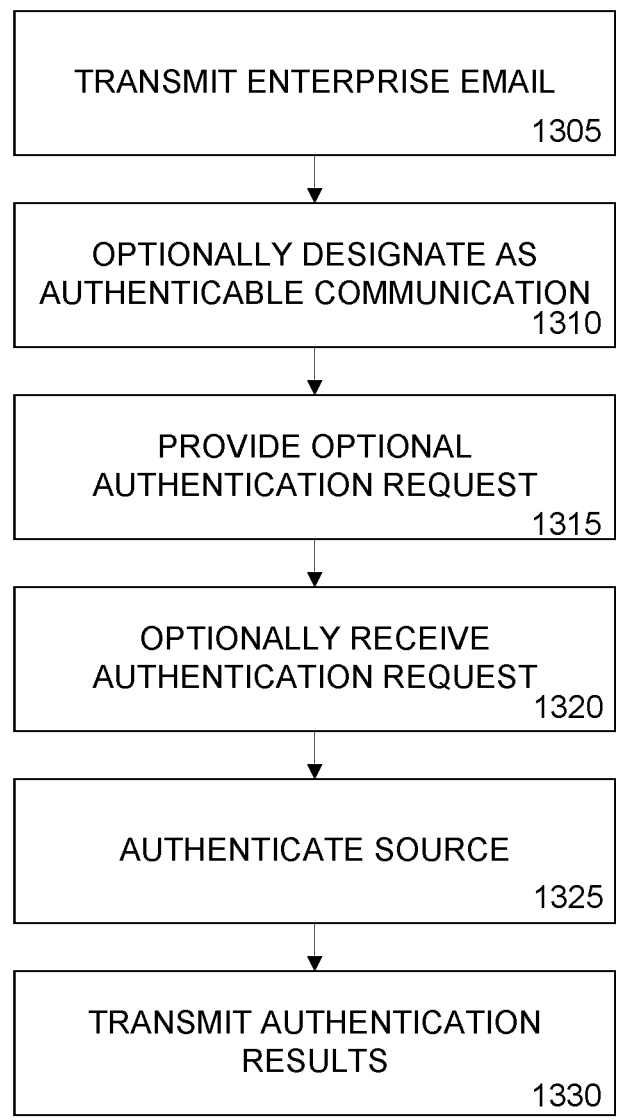
FIG. 13 illustrates exemplary method steps for transmitting an external email, according to some embodiments of the present disclosure.

Referring now to FIG. 13, exemplary method steps for transmitting an external email are illustrated. At 1305, an external enterprise email may be transmitted. In some aspects, at 1310, the enterprise email may be designated as an authenticable communication. At 1315, an authentication request option may be provided within the authenticable communication. In some embodiments, at 1320, an authentication request may be received. At 1325, the authenticable communication may be authenticated. At 1330, the authentication results may be transmitted.

Figure 14:
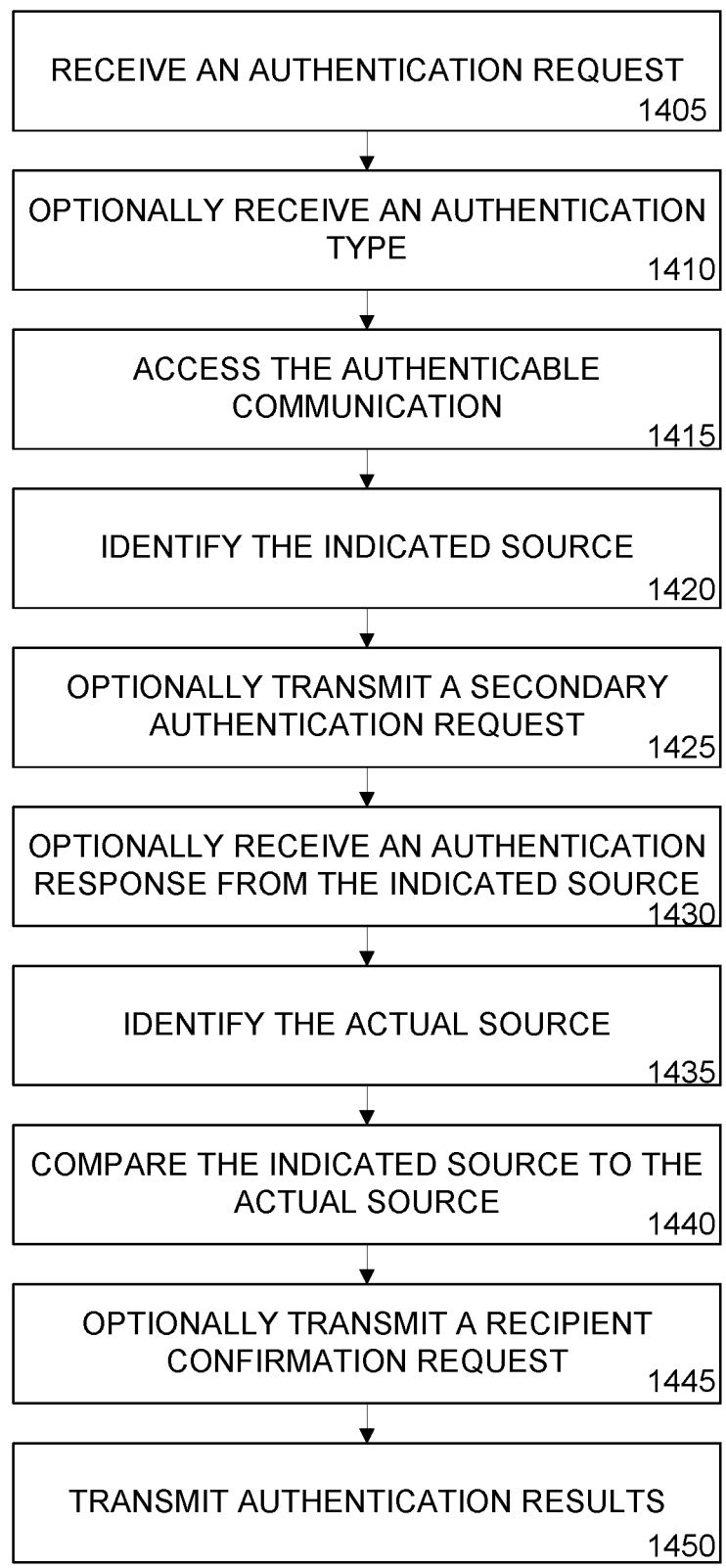
FIG. 14 illustrates exemplary method steps for authenticating a source of an authenticable communication, according to some embodiments of the present disclosure.

Referring now to FIG. 14, exemplary method steps for authenticating a source of an authenticable communication is illustrated. At 1405, an authentication request may be received. In some aspects, at 1410, an authentication type may be received, such as where the authentication type may be selectable by one or both the recipient and the actual source. At 1415, the authenticable communication may be accessed. At 1420, the indicated source may be identified.

In some embodiments, at 1425, a secondary authentication request may be transmitted, such as to the indicated source, which may prompt an action from the indicated source, and at 1430, the authentication response from the indicated source may be received. At 1435, the actual source may be identified, which may be informed at least in part by the authentication response received at 1430. At 1440, the indicated source may be compared to the actual source.

In some implementations, at 1445, a recipient confirmation request may be sent to the indicated source to confirm that the recipient or recipients were the intended recipients of the authenticable communication. At 1450, the authentication results may be transmitted. In some aspects, the authentication results may be transmitted to the authentication system, which may trigger access for the recipient to the contents of the authenticable communication. In some embodiments, the authentication may occur internally and automatically within the system without notifications or prompts sent to the recipient or the indicated source. In some implementations, portions of the process may include notifications or prompts to one or more of the indicated source, the actual source, and the recipient.

For example, where security may increase confidence in the authenticable communication, transmitting the authentication results at 1450 to the recipient may reassure the recipient that the authenticable communication is real and safe. As another example, such as with exchange of external authenticable communications, the enterprise may be concerned with internal cybersecurity issues that may not affect or even be considered by the indicated source and the recipient. There, the system may perform the authentication internally without providing results to the indicated source or the recipients.

Figure 15:
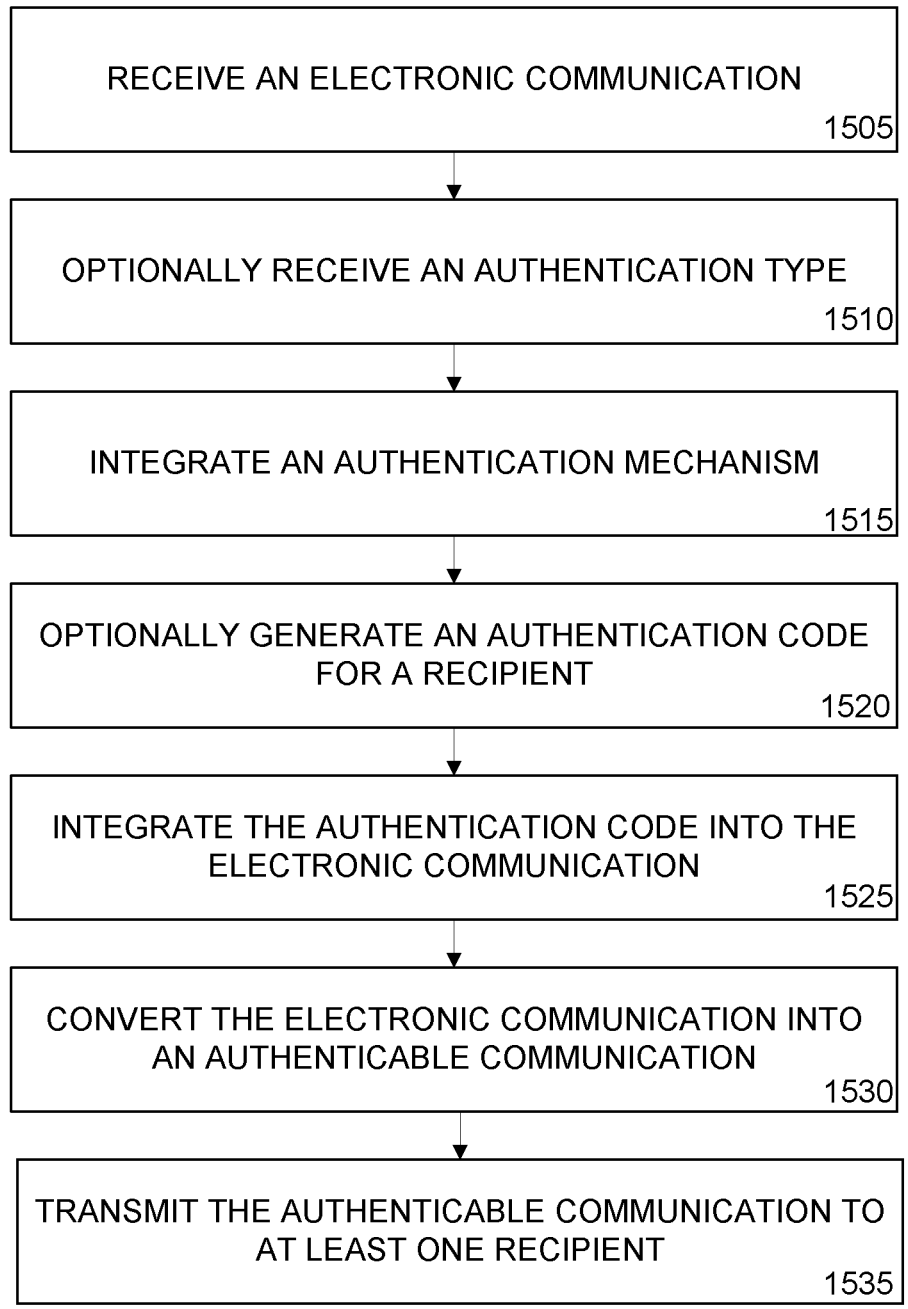
FIG. 15 illustrates exemplary method steps for providing an authenticable communication.

Referring now to FIG. 15, exemplary method steps for providing an authenticable communication are illustrated. At 1505, an electronic communication may be received. In some aspects, at 1510, an authentication type may be received, such as may be set or selected by an actual source, a recipient, or enterprise. At 1515, an authentication mechanism may be integrated into the electronic communication. In some embodiments, at 1520, an authentication code may be generated for the recipient or recipients, wherein the authentication code may be unique to each recipient or general based on the indicated source. At 1525, the authentication code into the electronic communication. At 1530, the electronic communication may be converted to an authenticable communication, and at 1535, the authenticable communication may be transmitted to at least one recipient. In some implementations, the authenticable communication may be presented to the actual source prior to the transmission at 1535.

Figure 16:
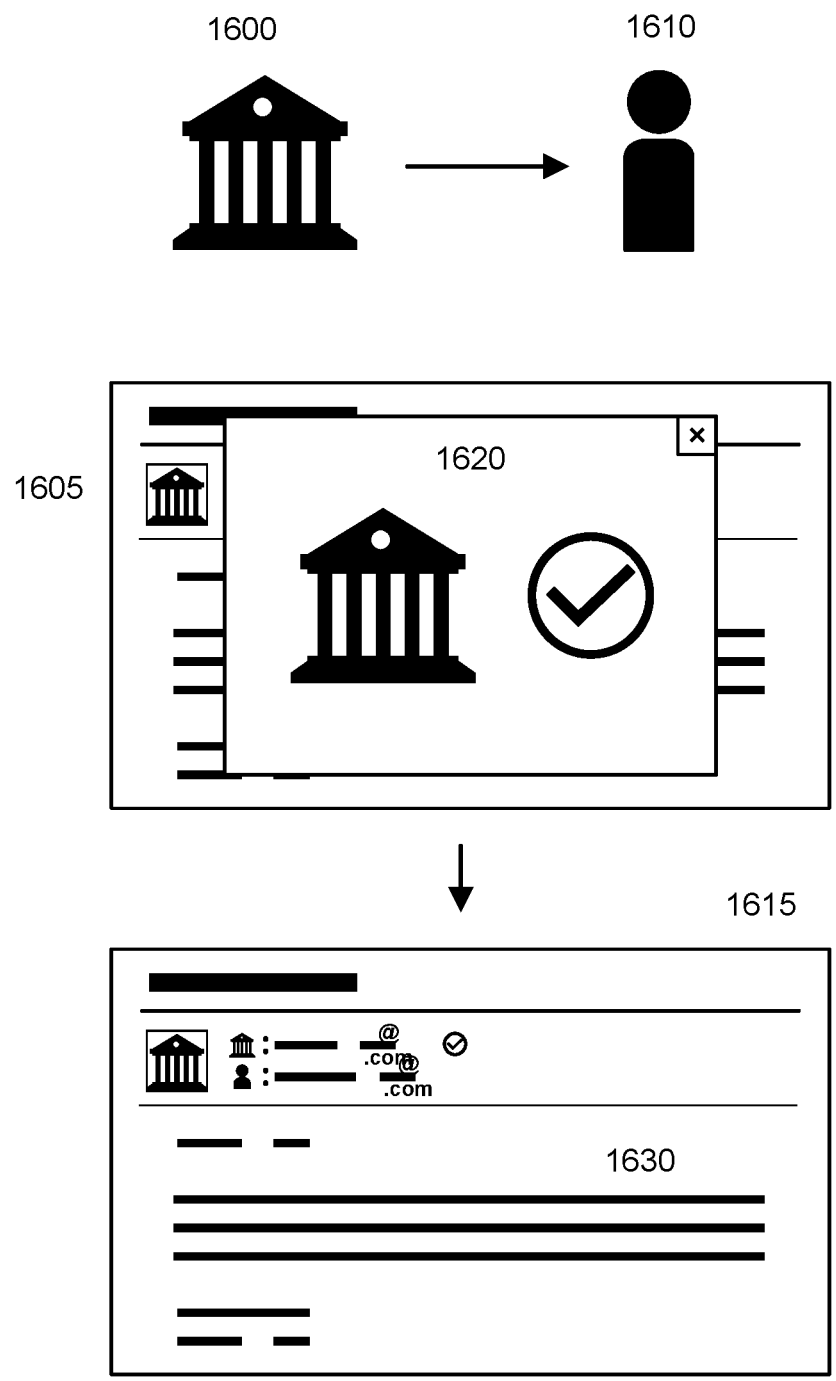
FIG. 16 illustrates exemplary process steps for providing content in an authenticable communication, according to some embodiments of the present disclosure.

Referring now to FIG. 16, exemplary process steps for providing content 1630 in an authenticable communication is illustrated. In some aspects, the institution 1600 may transmit a communication to an intended recipient 1610. In some embodiments, a communication may comprise an indicated source 1605, an intended recipient, and content 1630. In some implementations, a communication may be converted to an authenticable communication 1615. In some aspects, a conversion may embed at least one authentication mechanism, such as described in FIGS. 2A-4, as non-limiting examples. In some embodiments, a conversion may embed an authentication screen 1620, which may at least partially obscure content 1630.

In some aspects, an authenticable communication 1615 may be transmitted to the intended recipient 1610. In some implementations, a recipient may open the authenticable communication 1615, such as by clicking into it through an email platform, and an authentication screen 1620 may at least partially obscure content 1630. In some embodiments, the authentication screen 1620 may cause or prompt authentication of one or both the indicated source 1605 and the intended recipient 1610. An authentication screen 1620 may reappear based on predefined conditions, such as after a set amount of idle time or each time the authenticable communication 1615 is reopened, as non-limiting examples.

In some embodiments, the content 1630 may be provided in full to the recipient once the authentication screen 1620 is removed and one or both the indicated source 1605 and the intended recipient 1610 are authenticated. In some implementations, the authentication screen 1620 may be used to ensure that the intended recipient 1610 opens content 1630 safely. For example, content 1630 may comprise a link or attachments, and the intended recipient 1610 may click on the link or attachment, prompting the authentication screen 1620 to appear. In some implementations, access to the attachments may be locked until one or both the source and recipient are authenticated.

In some aspects, the locking may occur by withholding the attachments until authentication occurs. In some embodiments, the attachments may be temporarily stored in an intermediary database, such as an authentication system. Once authenticated, the attachments may be transmitted and deleted from the intermediary storage, which may limit the storage requirements and security risks for the authentication system.

Requiring authentication of one or both the indicated source 1605 and the intended recipient 1610 for the intended recipient 1610 to access content 1630 may limit exposure to security risks or sharing of sensitive information between incorrect parties. In some embodiments, the authentication screen 1620 may selectively obscure content 1630 that may be particularly sensitive or risky, such as links, attachments, and requests for personal information. In some embodiments, the intended recipient 1610 may be provided a limited view of content 1630 that may allow for general understanding of the purpose of the authenticable communication 1615 and may encourage authentication.

In some embodiments, an authenticable communication 1615 may comprise an article or news outlet, wherein a recipient 1610 may visit a website to access the authenticable communication 1615. In some aspects, authentication may allow the recipient to verify that the website was legitimately from a known source. In some implementations, authentication may allow the recipient to verify the author of the article. This may allow for increased confidence in quality and dependability when reading articles.

Figure 17A:
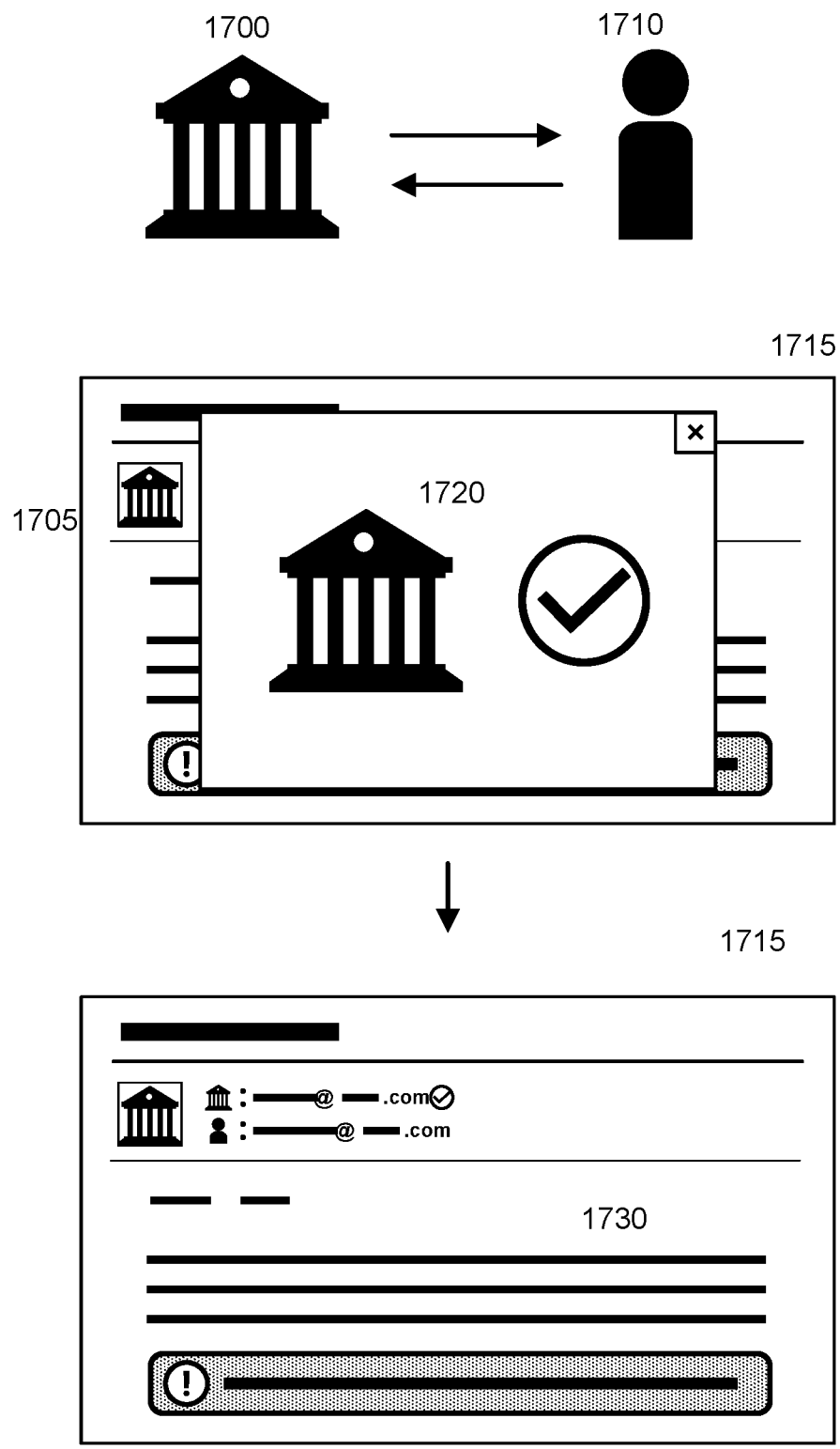
FIG. 17A illustrates exemplary process steps for providing content in an authenticable communication, according to some embodiments of the present disclosure.
Figure 17B:
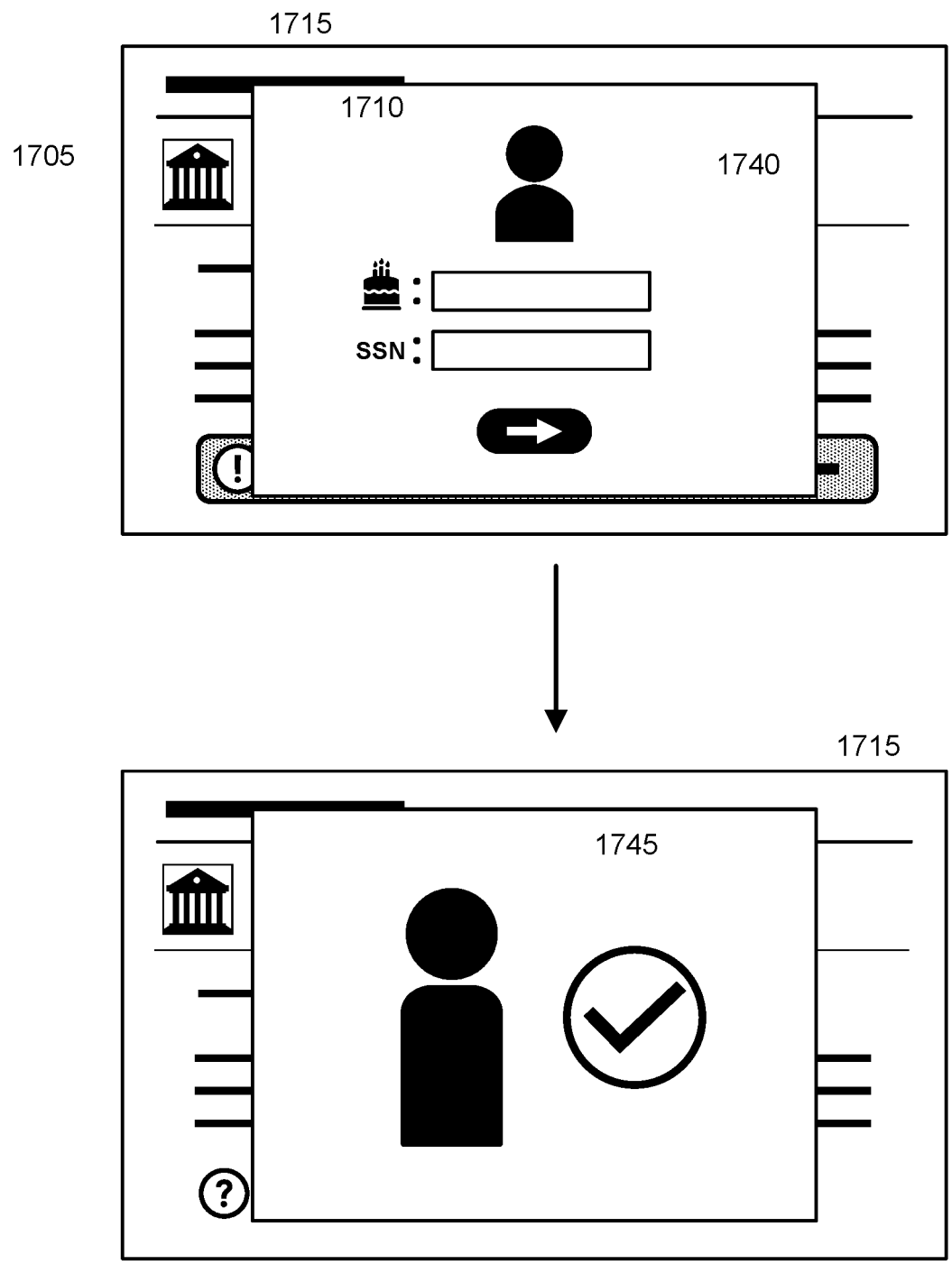
FIG. 17B illustrates exemplary process steps for providing content in an authenticable communication, according to some embodiments of the present disclosure.
Figure 17C:
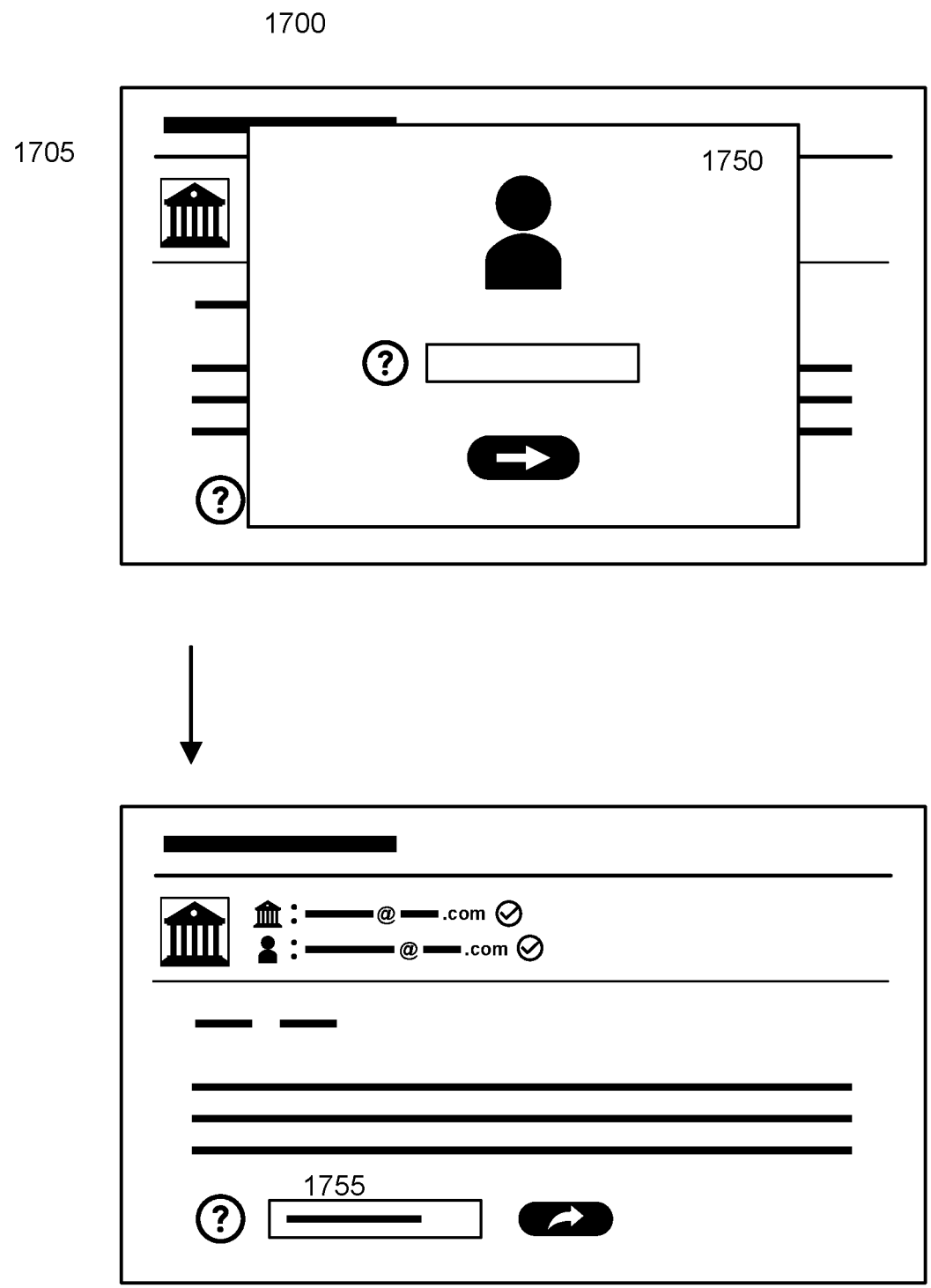
FIG. 17C illustrates exemplary process steps for providing content in an authenticable communication, according to some embodiments of the present disclosure.

Referring now to FIG. 17A-C, exemplary process steps for providing content in an authenticable communication 1715 is illustrated. In some aspects, an actual source 1700 may comprise an institution 1700 and may send an intended recipient 1710 an authenticable communication 1715 requesting information. In some aspects, the indicated source 1705 may determine which communications are sent with an authentication screen 1720. In some embodiments, embedding an authentication screen 1720 may be automatic based on predefined conditions, such as an external communication, communications to specific recipients or recipient groups, or content 1730, as non-limiting examples.

An authenticable communication 1715 may comprise an authentication screen 1720 that partially obscures content 1730 from the intended recipient 1710. In some aspects, the content 1730 may be completely blocked. The level of content blocked may be set by an actual source 1700, an intended recipient, a system, or combinations thereof. In some embodiments, a first authentication screen 1720 may authenticate the indicated source 1705 to confirm that it was an actual source 1700. This may provide the intended recipient 1710 with confidence knowing it originated from the indicated source 1705.

In some implementations, the content 1730 may request information from the recipient, and a recipient authentication screen 1740 may appear, which may request authentication of the intended recipient 1710. For example, before the user has full access to the content 1730, a recipient authentication screen 1740 may require specific information from the recipient such as, but not limited to, a password, access code, or clearance level to access the content 1730. In some implementations, once an intended recipient is authenticated 1745, an information input screen 1750 may appear and prompt input of the requested information from the content 1730. In some implementations, the recipient 1710 may have the ability to bypass the authentication screen 1720 based on their clearance level, type of content 1730 and other non-limiting factors.

In some embodiments, the recipient authentication screen 1740 may look similar to that of the authentication screen. In some aspects, the recipient authentication screen 1740 may comprise an input mechanism and prompt for information known by one or both the authentication system and the indicated source 1705. In some embodiments, the recipient authentication screen 1740 may have a series of questions rather than one singular question. In some embodiments, the intended recipient 1710 may be granted access to the content 1730 once all questions or required information has been provided and verified.

In some aspects, the information input screen 1750 may auto trigger a reply communication once the intended recipient 1710 has put in their information, and the communication reply may populate the response with the collected information 1755. In some aspects, the reply communication may be to a different address than the original sender. For example, the general email address for an institution may be the actual sender, and a reply communication may go to a specific individual within the institution assigned to the account. In some aspects, once the information input screen 1740 has been bypassed or completed, then the populated information 1745 may populate into the authenticable communication 1715.

In some implementations, the authenticable communication 1715 may comprise a document, such as a Word document or Adobe PDF. The authentication may occur within the document, wherein content access and editing abilities may be locked to one or both a recipient or source is authenticated. This may allow for secure access and editing of documents, such as may be useful for tax documents, documents requiring signature, or documents requesting sensitive information.

As an illustrative example, an authenticable communication 1715 may request address, income, personal information of family members, and tax information, and an intended recipient may enter the information into the information input screen 1750. That information may be populated into a response or directly into a system, such as through the actual source. The authenticable communication 1715 may comprise internal functionality that may allow for direct collection of data from an intended recipient without requiring a reply or other additional recipient actions.

In some embodiments, the authentication process may continue within a communication chain. For example, once the populated information 1755 is sent back to the source 1700 or reply recipient, the source 1700 or reply recipient may be treated as a recipient, requiring authentication. When the source 1700 becomes the recipient, the method of authentication may be the same or different than the source authentication.

Figure 18A:
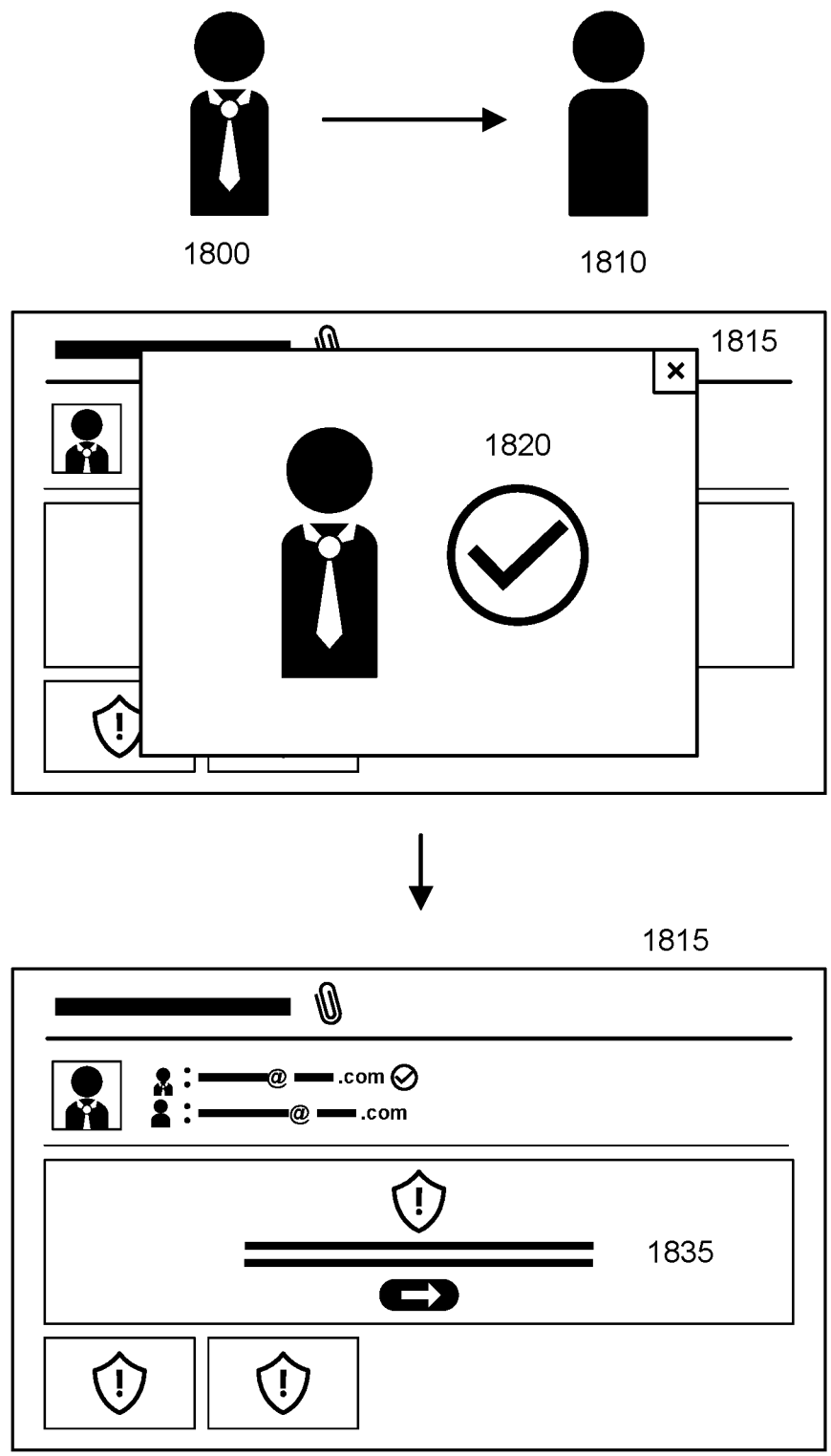
FIG. 18A illustrates exemplary process steps for providing content in an authenticable communication, according to some embodiments of the present disclosure.
Figure 18B:
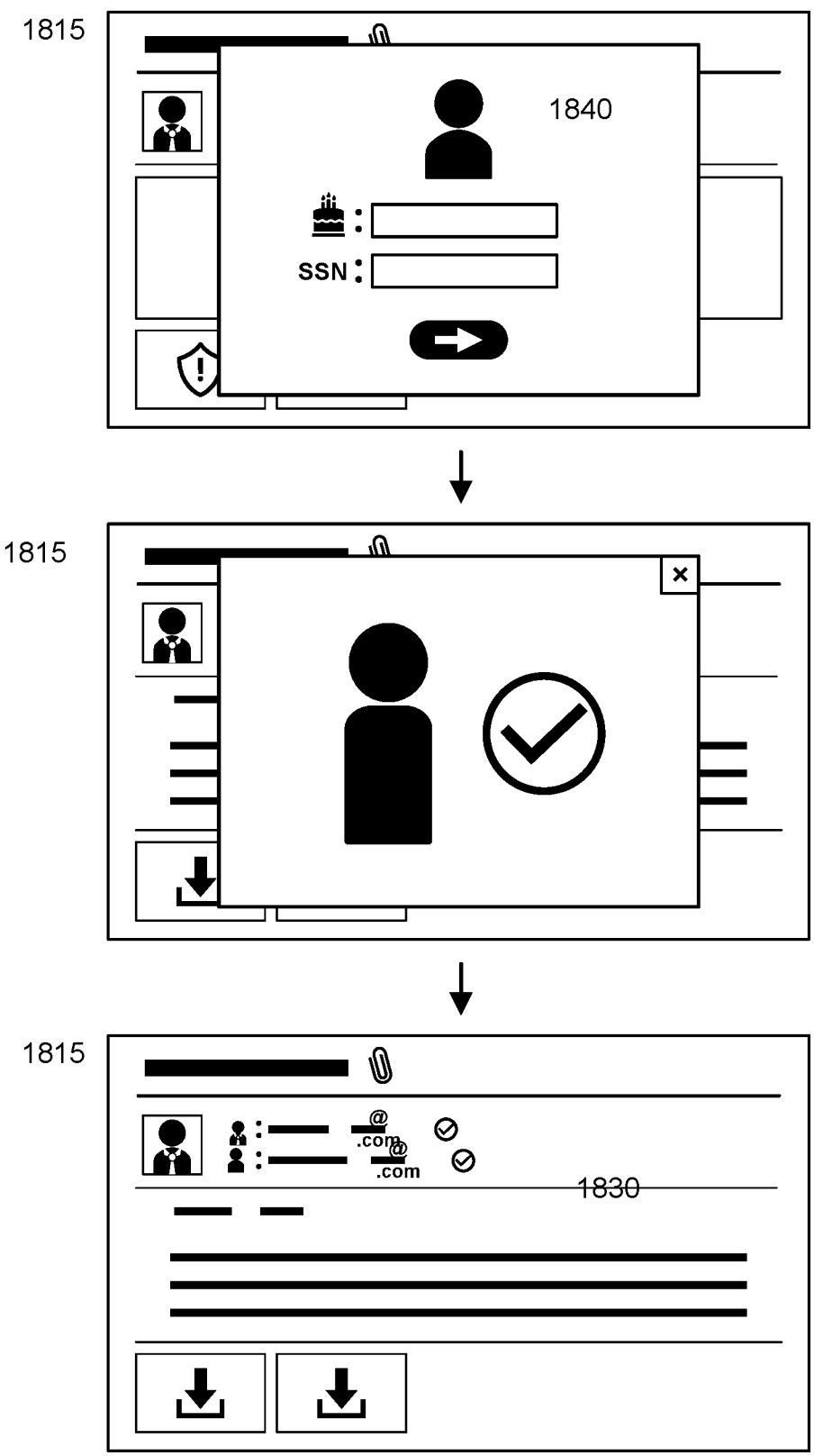
FIG. 18B illustrates exemplary process steps for providing content in an authenticable communication, according to some embodiments of the present disclosure.

Referring now to FIG. 18A-B, exemplary process steps for providing content 1830 in an authenticable communication 1815 are illustrated. In some aspects, the actual source 1800 may be an individual such as a doctor, tax person, lawyer, or professor as non-limiting examples. In some aspects, the actual source 1800 may have a professional relationship with the intended recipient 1810 and may exchange authenticable communications 1815 when discussing sensitive topics, such as health care, financial, or legal. In some aspects, the actual source 1800 may send an authenticable communication 1815, and an authentication screen 1820 may pop up when the intended recipient 1810 attempts to access the content 1830.

The authentication screen 1820 may at least partially obscure content 1830 from the intended recipient 1810. In some aspects, the intended recipient 1810 may be required to actively request authentication of the indicated source 1800. In some implementations, authentication may automatically occur when the intended recipient attempts to access the content 1830, and the authentication screen 1820 may indicate the results of the authentication. In some embodiments, authentication of the indicated source may require input from the intended recipient 1810 into the authentication screen 1820.

In some embodiments, once the authentication screen 1820 has been removed and the indicated source authenticated, a pre-authentication screen 1835 may indicate that more authentication may be required to fully access the content 1830. In some embodiments, a pre-authentication screen 1835 may not always be needed after the authentication screen 1820. In some embodiments, a pre-authentication screen 1835 and authentication screen 1820 may be redundant and only one may be required to gain access. In some embodiments, the authentication screen 1820 may be a precursor to the pre-authentication screen 1835 letting the intended recipient 1810 know that authentication may be required in the following steps.

In some implementations, a recipient authentication screen 1840 may require the intended recipient 1810 to enter required information, which may allow the system to confirm that the intended recipient 1810 is the actual recipient. In some embodiments, the recipient authentication screen 1840 may request a username and password, a pin, or other authenticating code to gain access to the content 1830. In some aspects, the recipient authentication screen 1840 may be predictable, wherein the intended recipient 1810 may input the same information each time. In some implementations, the recipient authentication screen 1840 may appear randomized, wherein the prompts may be selected from a group of predefined questions each time a recipient authentication screen 1840 is presented.

Figure 19A:
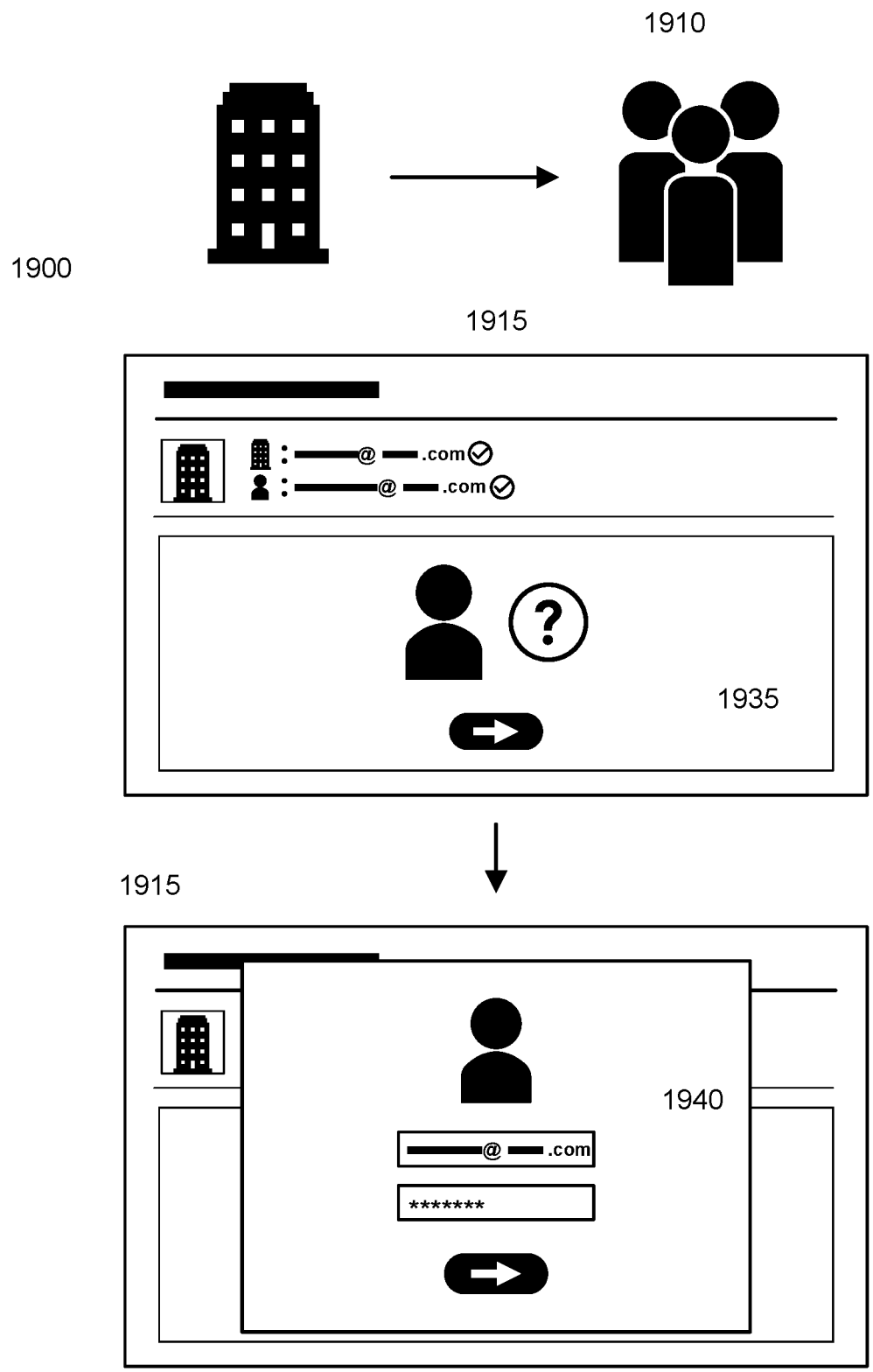
FIG. 19A illustrates exemplary process steps for providing content in an internal authenticable communication, according to some embodiments of the present disclosure.
Figure 19B:
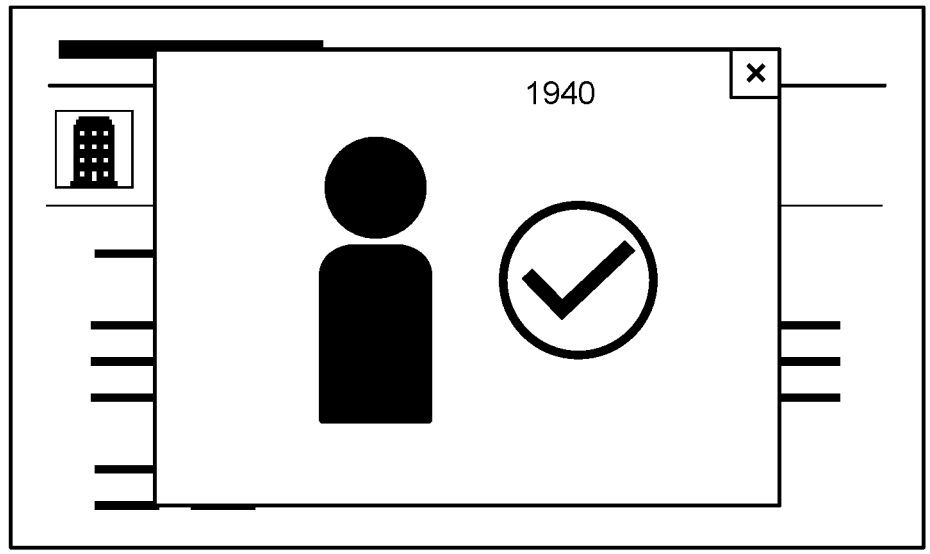
FIG. 19B illustrates exemplary process steps for providing content in an internal authenticable communication, according to some embodiments of the present disclosure.
Figure 19B:
Figure 19B:
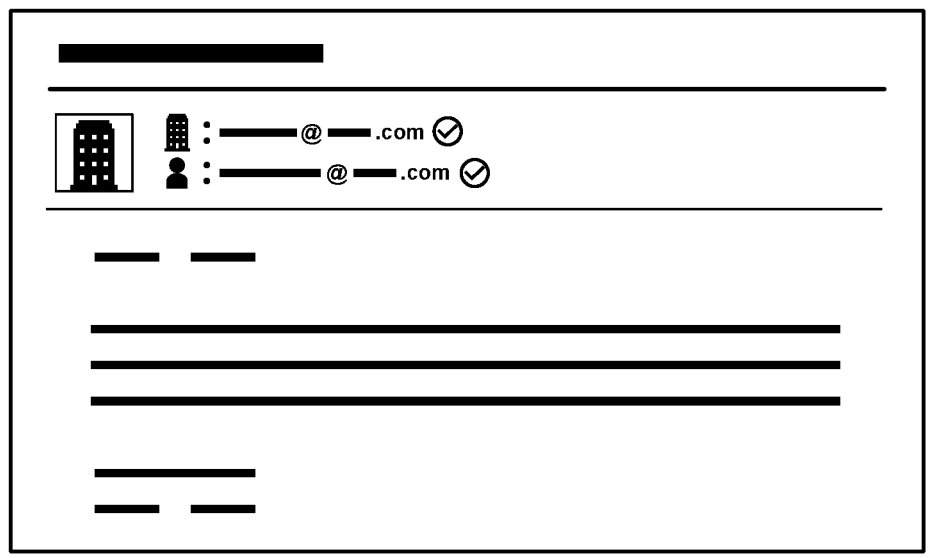

Referring now to FIG. 19A-B, exemplary process steps for providing content 1930 in an internal authenticable communication 1915 are illustrated. In some aspects, the actual source 1900 may be an institution, company, or individual from within an institution or company, as non-limiting examples. In some embodiments, the intended recipients 1910 may be one or more individuals within an institution 1900. In some aspects, an internal authenticable communication 1915 may allow for automatic authentication of an indicated source 1900. In some implementations, an authenticable communication 1915 may provide a pre-authentication screen 1935 that may indicate that authentication may be required from the recipient 1910. In some aspects, the recipient authentication screen 1940 may require the intended recipient 1910 to put in their username and password, such as may be provided by the institution. In some aspects, the recipient authentication screen may partially obscure the content 1930 until the intended recipient 1910 is authenticated.

In some aspects, an intended recipient 1910 may initiate the authentication and click on the pre-authentication screen 1935, which may prompt display of the recipient authentication screen 1940. In some embodiments, the content 1930 may be partially filtered based on the intended recipient 1910 and the clearance level of the person viewing the content 1930. For example, one intended recipient 1910 may have a different view of the content 1930 than another. One recipient may have full access to the content 1930 whereas another may only have view of the first part of the content 1930. As another example, all recipients may have a limited view of the content 1930, and then some recipients may gain further access based on their input on the recipient authentication screen 1940.

Figure 20A:
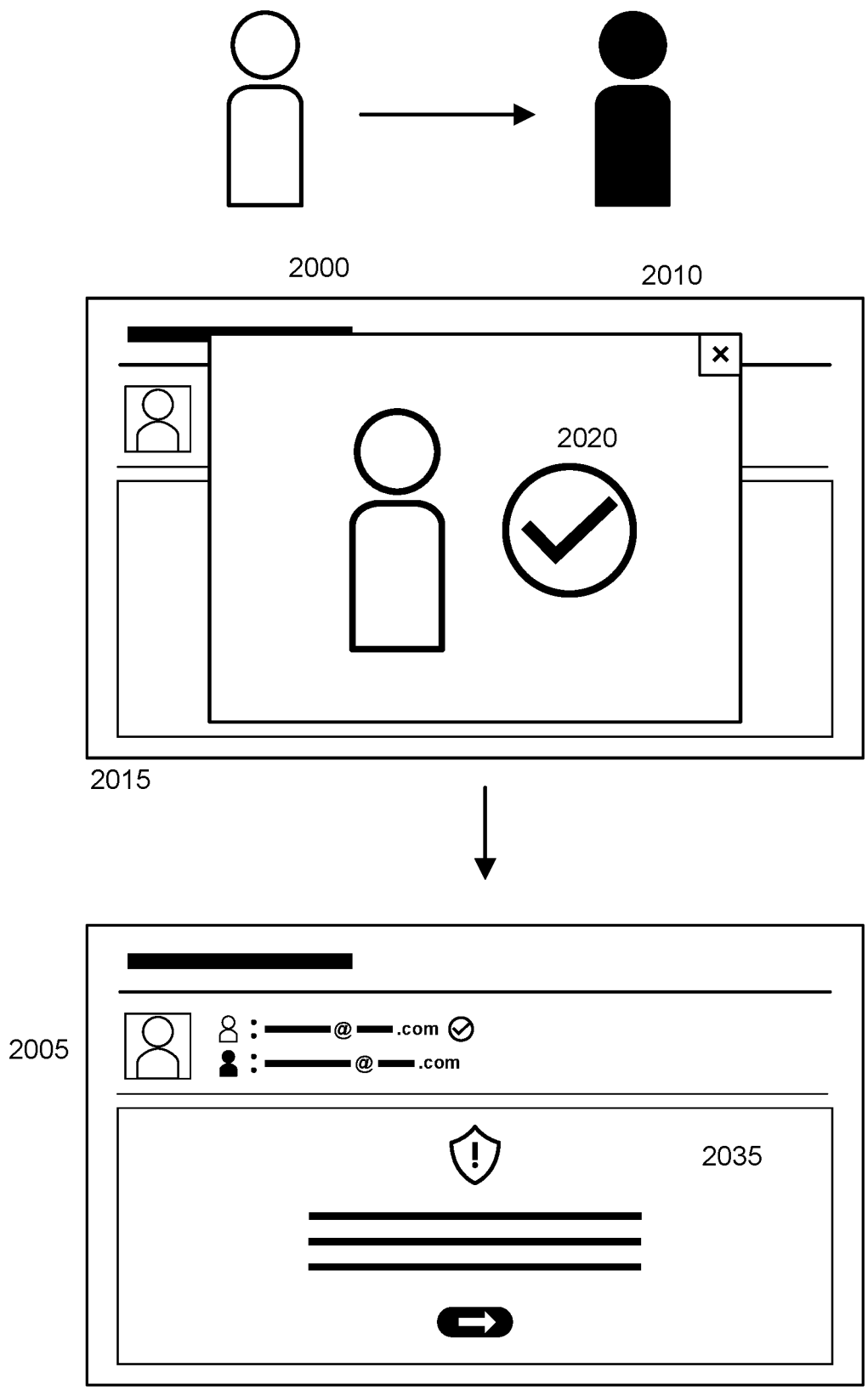
FIG. 20A illustrates exemplary process steps providing content in a personal authenticable communication, according to some embodiments of the present disclosure.
Figure 20B:
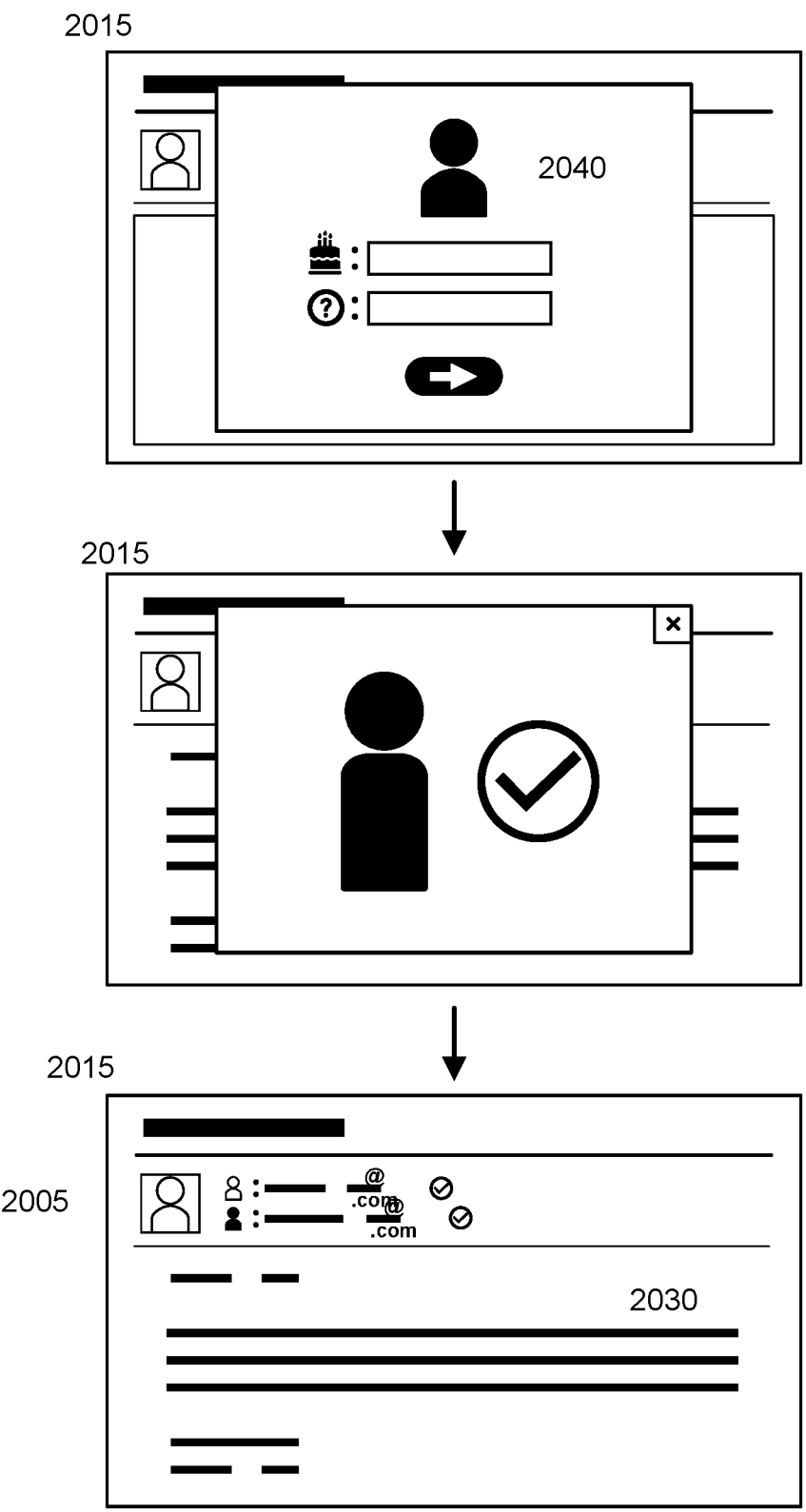
FIG. 20B illustrates exemplary process steps providing content in a personal authenticable communication, according to some embodiments of the present disclosure.

Referring now to FIG. 20A-B, exemplary process steps providing content in a personal authenticable communication 2015 are illustrated. In some aspects, the actual source 2000 may be an individual sending a personal authenticable communication 2015 to an intended recipient 2010 who may be a friend or acquaintance. In some embodiments, the actual source 2000 may be sending a personal message to an intended recipient 2010. In some implementations, a recipient may attempt to access the content 2030, and an authentication screen 2020 may obscure at least a portion of the content 2030. In some aspects, the authentication screen 2020 may authenticate the indicated source 2000.

In some embodiments, the initial authentication screen 2020 to separately authenticate an indicated source 2000 may not be required. In some aspects, a pre-authentication screen 2035 may serve as an initial screen that may block the content 2030 and notify a recipient that authentication may be necessary. In some implementations, a pre-authentication screen 2035 may provide a brief summary or hint to the actual content 2030.

In some embodiments, one or both the pre-authentication screen 2035 and the recipient authentication screen 2040 may provide information that may allow the intended recipient 2010 to personally confirm that the indicated source is the actual source 2000. For example, the pre-authentication screen 2035 may describe a personal memory or inside joke. In some aspects, the questions presented in the recipient authentication screen 2040 may allow the intended recipient 2010 to personally confirm the indicated source 2005. This may allow for secure communication between friends and acquaintances, where they could exchange communications knowing only the intended recipient would be able to access the content 2030.

In some embodiments, the question or required information asked by the recipient authentication screen 2040 may ask a personal question or for personal information that may be known by the actual source 2000. For example, the security question may ask where the intended recipient 2010 ate lunch last week with the indicated source 2005, their favorite horror film, favorite television show, or nickname, as non-limiting examples. In some implementations, the acceptable input to the prompt may be set by the actual source 2000, such as through an authentication system database, where authentication mechanisms and authentication data may be collected and stored.

In some aspects, content 2030 may be provided once the recipient has been authenticated. In some embodiments, response data may be transmitted back to the actual source 2000. In some implementations, the intended recipient may have the ability to view the content 2030 in full once they have passed the recipient authentication screen 2040. In some aspects, the recipient 2010 may only have access to part of the content 2030 depending on the answers provided.

Figure 21A:
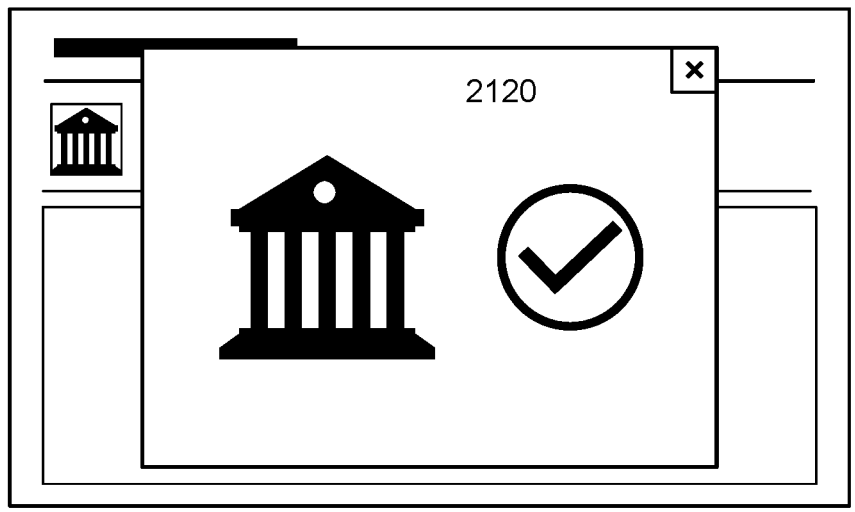
FIG. 21A illustrates exemplary process steps for providing content for an authenticable communication through an external authentication communication, according to some embodiments of the present disclosure.
Figure 21A:
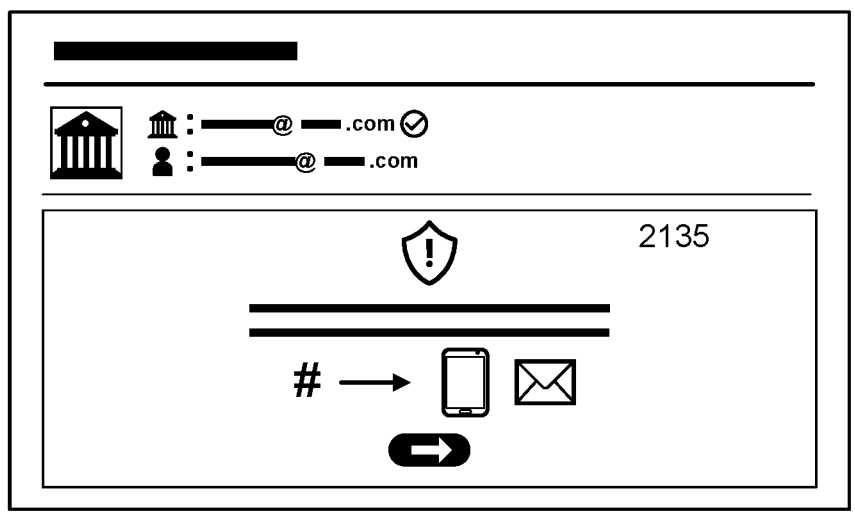
Figure 21A:
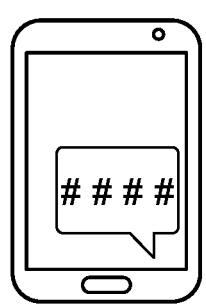
Figure 21A:
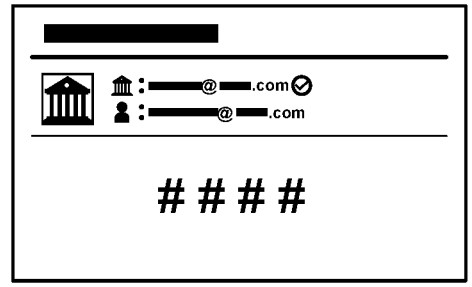
Figure 21B:
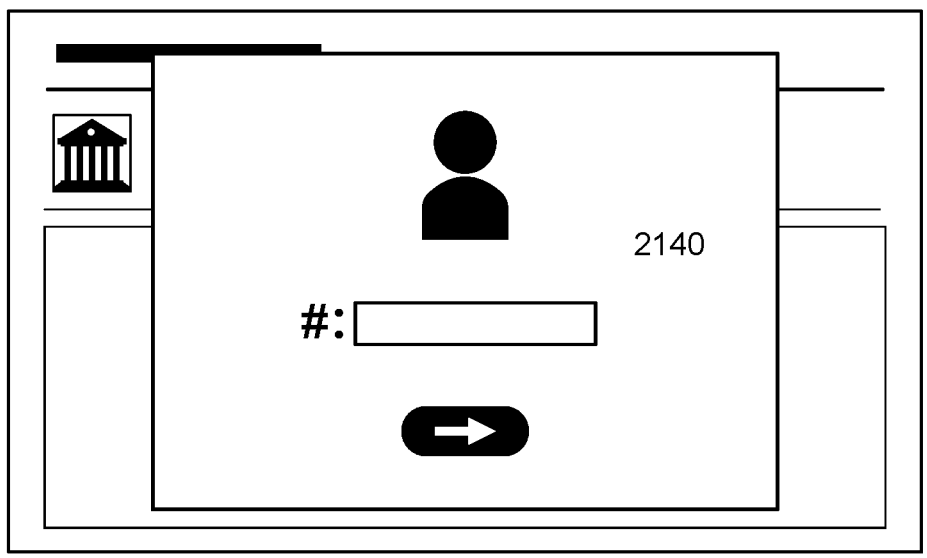
FIG. 21B illustrates exemplary process steps for providing content for an authenticable communication through an external authentication communication, according to some embodiments of the present disclosure.
Figure 21B:
Figure 21B:
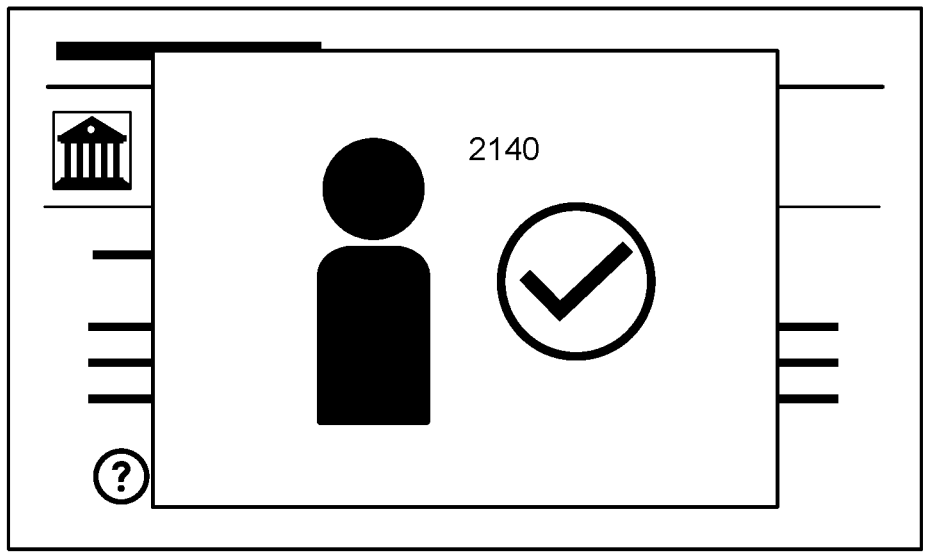
Figure 21C:
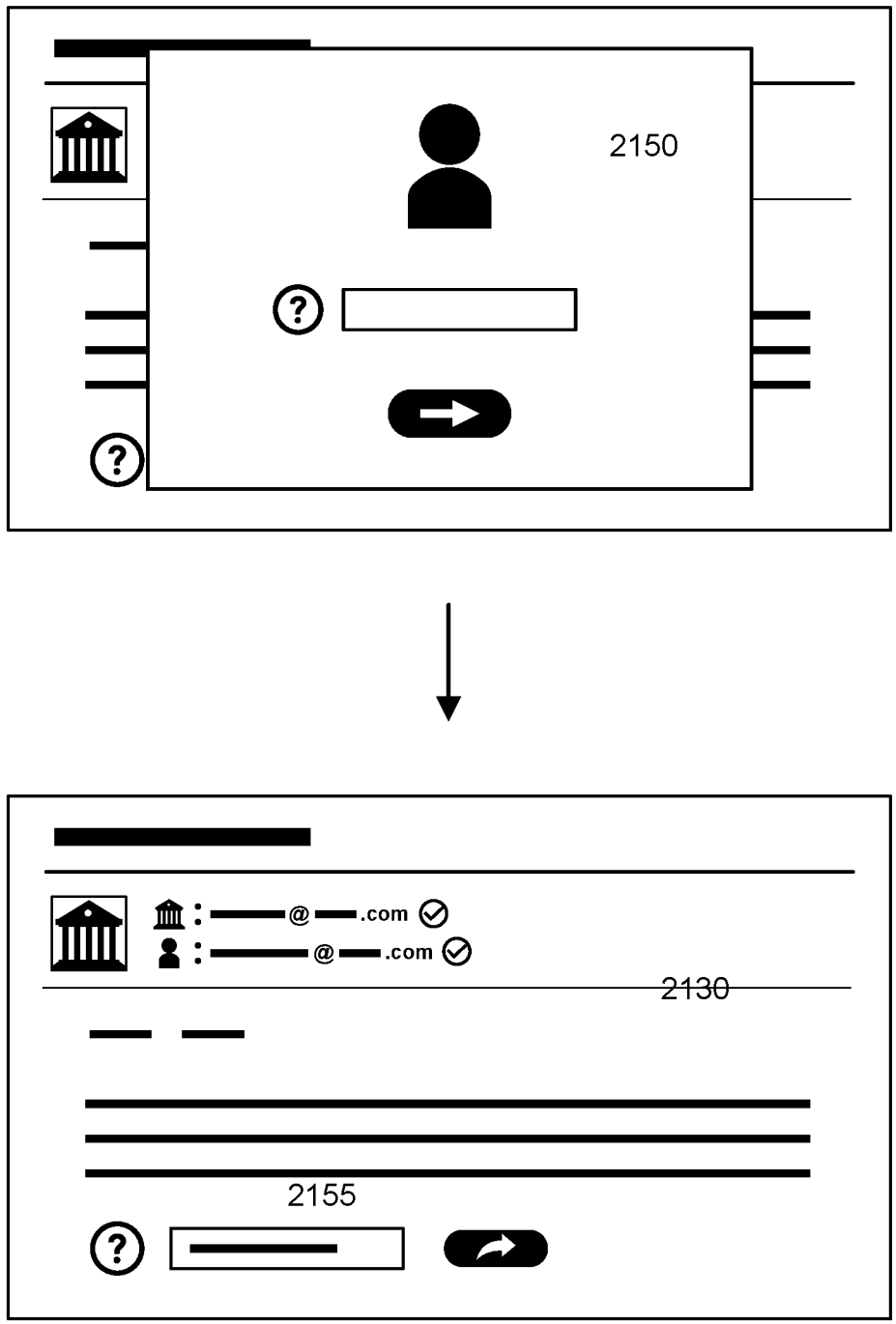
FIG. 21C illustrates exemplary process steps for providing content for an authenticable communication through an external authentication communication, according to some embodiments of the present disclosure.

Referring now to FIG. 21A-C, exemplary process steps for providing content 2130 for an authenticable communication 2115 through an external authentication communication 2160 are illustrated. In some aspects, source authentication may occur automatically and a source authentication screen 2120 may be displayed to confirm to the recipient that authentication occurred. In some embodiments, an intended recipient may be registered with an authentication system, directly or indirectly through an actual source, wherein a destination for an external authentication communication 2160 may be predefined.

In some aspects, a pre-authentication screen 2135 may indicate to the recipient that they need to access an external authentication communication 2160, such as text, email, push notification from a software application, or internal software application message, as non-limiting examples. In some aspects, an external authentication communication 2160 may be automatically transmitted when a recipient attempts to access the content 2130, such as when they open the authenticable communication 2115, click into a pre-authentication screen 2135, or explicit request transmission through the pre-authentication screen 2135.

In some embodiments, the external authentication communication 2160 may provide a time-limited code, wherein a recipient must input the code into a recipient authentication screen 2140 within a predefined time to access the content 2130. In some aspects, the recipient may have been pre-enrolled in the authentication system that allows them to authenticate the message containing the content 2130 from an external source.

In some aspects, the external authentication communication 2160 may be transmitted through a smart device, mobile device, or computer, as non-limiting examples. In some aspects, the external authentication communication 2160 may be transmitted through an app associated with the actual source, such as a banking application or tax provider application. In some embodiments, the external authentication communication 2160 may be transmitted through a central authentication app, which may be used by multiple sources. In some aspects, clicking into the authenticable communication 2115 may automatically send an authentication code to the external source allowing the recipient to access the content 2130. In some aspects, the source may send an authentication code through text, email or in-app depending on the recipient preference. In some implementations, pre-registering recipients may allow for efficient authentication without requiring layers of logging in to separate systems and applications.

In some embodiments, once the recipient logs in then they may gain access to the recipient authentication screen 2140. In some embodiments, the recipient may then enter their access code or required information to bypass the recipient authentication screen 2140 and view content 2130. In some embodiments, the recipient may enter an access code, password and username, personal information, or any other non-limiting example that may grant the recipient access to the content 2130.

In some embodiments, once the recipient has been authenticated, they may gain access to an information input screen 2150. In some embodiments, the information input screen 2150 may allow for direct input of recipient information based on source requested data. In some implementations, the content 2130 may be fully accessible once the recipient has been granted by the system. In some implementations, the populated information 2155 may be directly input into a response or document that would be sent back to the actual source or another designated location.

As an illustrative example, the actual source may comprise a tax advisor who may have a small local company. The tax advisor may periodically send and request sensitive information and documents to clients, and the tax advisor may not be large enough to have their own software application. The tax advisor may request that their clients register with an authentication system, which may require input of limited personal information, contact information, and answers to predefined questions, as non-limiting examples. That information may be used to create a dynamic authentication method for each client. Some of the clients may prefer answering specific questions in a recipient authentication screen 2140, and others may prefer receiving an external authentication communication 2160 that contains no personal information.

The tax advisor may be able to adjust the authentication requirements depending on the content of the authenticable communication. A general information communication may not need to be authenticable. A communication providing tax guidance or other information that a recipient may only trust if it came directly from the tax advisor may be embedded with a source authentication screen and source authentication mechanism. A communication sending or requesting personal documents and information may require a dual layer of authentication. In some aspects, the dual layer may comprise two separate authentication screens that may separately authenticate the source and the recipient. In some embodiments, the dual layer may comprise transmission of an external authentication communication that could only transmit to the recipient if the indicated source was the actual source.

The tax advisor may request that a client complete a form or provide specific information. For efficiency and security, once fully authenticated, an authenticable communication may prompt input of the requested information, which may be directly inserted or populated into the reply or the document. This may limit the need to visit an external site or app to complete the request and may allow the recipient to operate within the authenticable communication.

Figure 22:
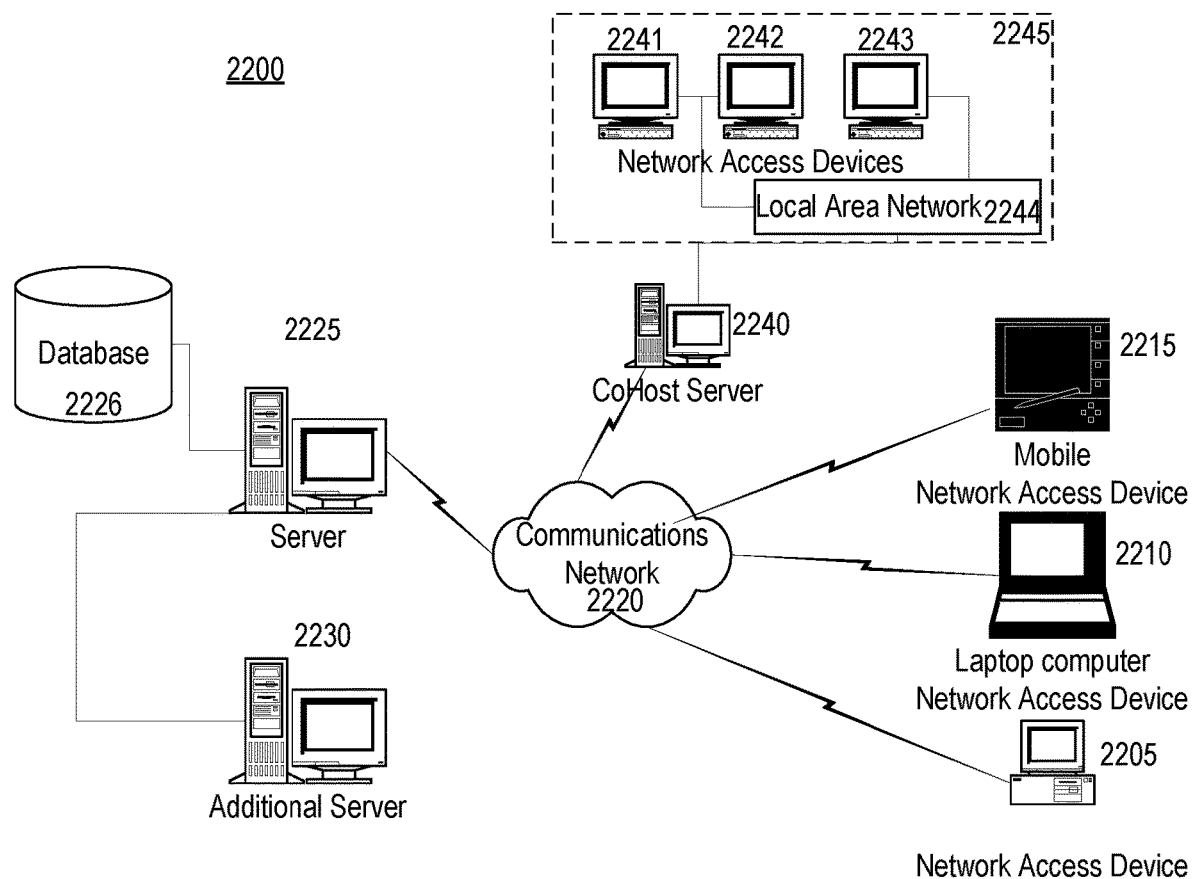
FIG. 22 illustrates an exemplary processing and interface system, according to some embodiments of the present disclosure.

Referring now to FIG. 22, an exemplary processing and interface system 2200 is illustrated. In some aspects, access devices 2215, 2210, 2205, such as a paired portable device 2215 or laptop computer 2210 may be able to communicate with an external server 2225 through a communications network 2220. The external server 2225 may be in logical communication with a database 2226, which may comprise data related to identification information and associated profile information. In some embodiments, the server 2225 may be in logical communication with an additional server 2230, which may comprise supplemental processing capabilities.

In some aspects, the server 2225 and access devices 2205, 2210, 2215 may be able to communicate with a cohost server 2240 through a communications network 2220. The cohost server 2240 may be in logical communication with an internal network 2245 comprising network access devices 2241, 2242, 2243 and a local area network 2244. For example, the cohost server 2240 may comprise a payment service, such as PayPal or a social network, such as Facebook or a dating website.

Figure 23:
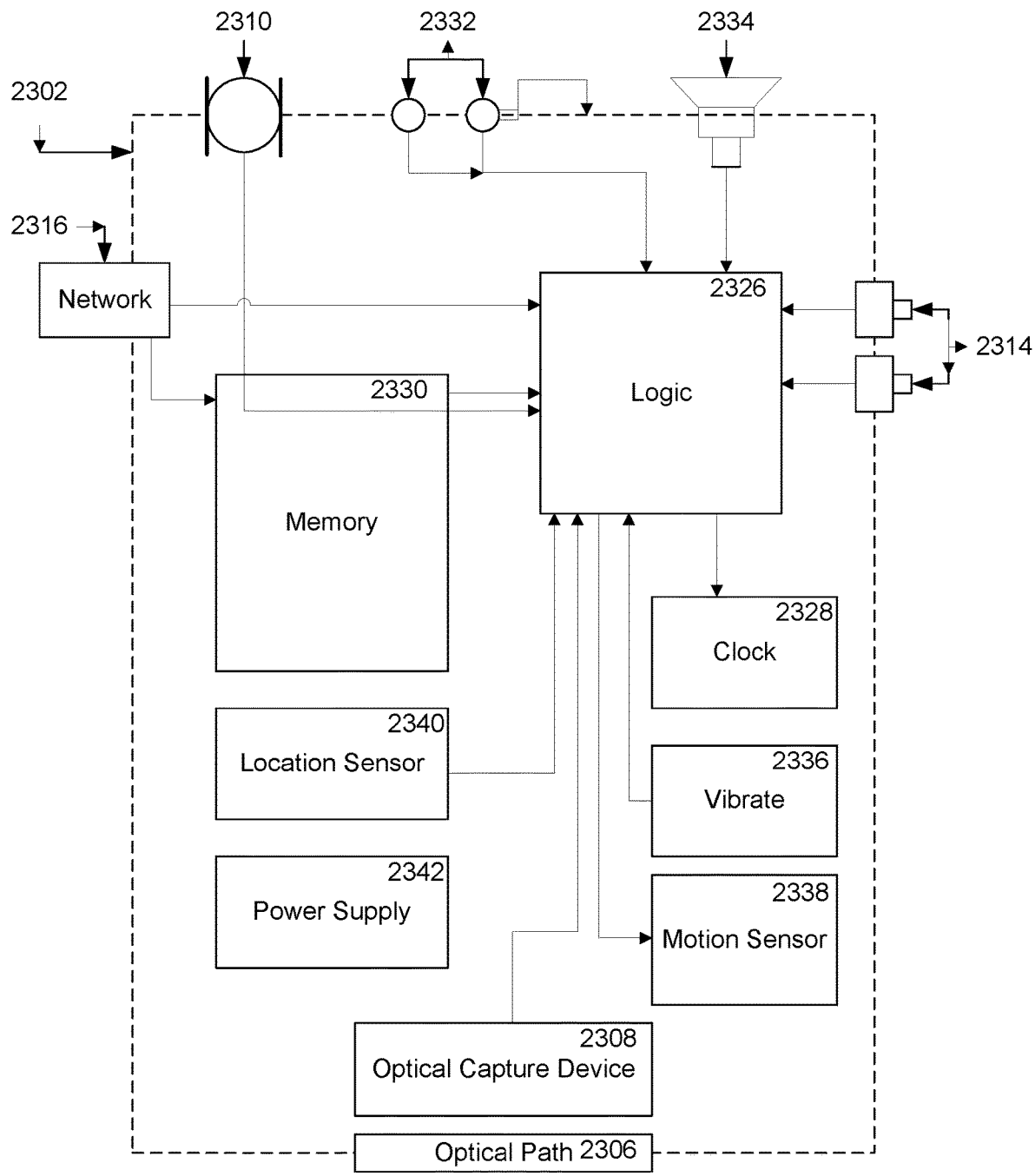
FIG. 23 illustrates an exemplary block diagram of an exemplary embodiment of a mobile device, according to some embodiments of the present disclosure.

Referring now to FIG. 23, an exemplary block diagram of an exemplary embodiment of a mobile device 2302 is illustrated. The mobile device 2302 may comprise an optical capture device 2308, which may capture an image and convert it to machine-compatible data, and an optical path 2306, typically a lens, an aperture, or an image conduit to convey the image from the rendered document to the optical capture device 2308. The optical capture device 2308 may incorporate a Charge-Coupled Device (CCD), a Complementary Metal Oxide Semiconductor (CMOS) imaging device, or an optical sensor of another type.

In some embodiments, the mobile device 2302 may comprise a microphone 2310, wherein the microphone 2310 and associated circuitry may convert the sound of the environment, including spoken words, into machine-compatible signals. Input facilities 2314 may exist in the form of buttons, scroll-wheels, or other tactile sensors such as touchpads. In some embodiments, input facilities 2314 may include a touchscreen display. Visual feedback 2332 to the user may occur through a visual display, touchscreen display, or indicator lights. Audible feedback 2334 may be transmitted through a loudspeaker or other audio transducer. Tactile feedback may be provided through a vibration module 2336.

In some aspects, the mobile device 2302 may comprise a motion sensor 2338, wherein the motion sensor 2338 and associated circuitry may convert the motion of the mobile device 2302 into machine-compatible signals. For example, the motion sensor 2338 may comprise an accelerometer, which may be used to sense measurable physical acceleration, orientation, vibration, and other movements. In some embodiments, the motion sensor 2338 may comprise a gyroscope or other device to sense different motions.

In some implementations, the mobile device 2302 may comprise a location sensor 2340, wherein the location sensor 2340 and associated circuitry may be used to determine the location of the device. The location sensor 2340 may detect Global Position System (GPS) radio signals from satellites or may also use assisted GPS where the mobile device may use a cellular network to decrease the time necessary to determine location. In some embodiments, the location sensor 2340 may use radio waves to determine the distance from known radio sources such as cellular towers to determine the location of the mobile device 2302. In some embodiments these radio signals may be used in addition to and/or in conjunction with GPS.

In some aspects, the mobile device 2302 may comprise a logic module 2326, which may place the components of the mobile device 2302 into electrical and logical communication. The electrical and logical communication may allow the components to interact. Accordingly, in some embodiments, the received signals from the components may be processed into different formats and/or interpretations to allow for the logical communication. The logic module 2326 may be operable to read and write data and program instructions stored in associated storage 2330, such as RAM, ROM, flash, or other suitable memory. In some aspects, the logic module 2326 may read a time signal from the clock unit 2328. In some embodiments, the mobile device 2302 may comprise an on-board power supply 2342. In some embodiments, the mobile device 2302 may be powered from a tethered connection to another device, such as a Universal Serial Bus (USB) connection.

In some implementations, the mobile device 2302 may comprise a network interface 2316, which may allow the mobile device 2302 to communicate and/or receive data to a network and/or an associated computing device. The network interface 2316 may provide two-way data communication. For example, the network interface 2316 may operate according to an internet protocol. As another example, the network interface 2316 may comprise a local area network (LAN) card, which may allow a data communication connection to a compatible LAN. As another example, the network interface 2316 may comprise a cellular antenna and associated circuitry, which may allow the mobile device to communicate over standard wireless data communication networks. In some implementations, the network interface 2316 may comprise a Universal Serial Bus (USB) to supply power or transmit data. In some embodiments, other wireless links known to those skilled in the art may also be implemented.

Conclusion

A number of embodiments of the present disclosure have been described. While this specification contains many specific implementation details, this should not be construed as limitations on the scope of any disclosures or of what may be claimed, but rather as descriptions of features specific to particular embodiments of the present disclosure.

Certain features that are described in this specification in the context of separate embodiments can also be implemented in combination or in a single embodiment. Conversely, various features that are described in the context of a single embodiment can also be implemented in combination in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Nevertheless, it will be understood that various modifications may be made without departing from the spirit and scope of the claimed disclosure.

What is claimed is:

1. A computer-implemented method for providing an authenticable communication, the computer-implemented method comprising:
   receiving a first electronic communication comprising at least an actual source and original content;
   converting the first electronic communication to an authenticable communication, wherein converting comprises:
      generating at least one authentication mechanism for the authenticable communication, wherein the at least one authentication mechanism at least partially comprises at least one correlation between at least one detectable element of the first electronic communication and an initial transmission of the first electronic communication, wherein the initial transmission of the first electronic communication comprises a primary data transmission pathway; and
      storing the at least one authentication mechanism in at least one memory resource;
   receiving a second electronic communication, wherein the second electronic communication comprises a secondary data transmission pathway, wherein the second electronic communication comprises replicated content transmitted from an indicated source to the one or more of a plurality of potential recipients via the secondary data transmission pathway; and
   detecting the at least one detectable element within the second electronic communication;
   comparing at least one portion of the replicated content of the second electronic communication with at least one portion of the original content of the authenticable communication.

2. The computer-implemented method of claim 1, further comprising:
   detecting the at least one detectable element within the second electronic communication.

3. The computer-implemented method of claim 2, wherein the primary data transmission pathway facilitates transmission of the authenticable communication to one or more of a plurality of potential recipients.

4. The computer-implemented method of claim 3, wherein the primary data transmission pathway of the authenticable communication comprises a repeatedly accessible data transmission pathway from at least one storage medium.

5. The computer-implemented method of claim 4, wherein the primary data transmission pathway of the authenticable communication is configured to be accessed a plurality of times from at least one server by the one or more of a plurality of potential recipients via one or more computing devices.

6. The computer-implemented method of claim 4, wherein comparing the at least one portion of the replicated content of the second electronic communication with the at least one portion of the original content of the authenticable communication identifies at least one difference between the replicated content and the original content.

7. The computer-implemented method of claim 1, further comprising:
   determining at least one quantified representation of one or more results of the comparison between the original content of the authenticable communication and the replicated content of the second electronic communication.

8. The computer-implemented method of claim 7, wherein the at least one quantified representation comprises at least one indicator of a degree of similarity between the original content and the replicated content.

9. A computer-implemented method for providing an authenticable communication, the computer-implemented method comprising:
   receiving a first electronic communication comprising at least an actual source and original content;
   converting the first electronic communication to an authenticable communication, wherein converting comprises:
      generating at least one authentication mechanism for the authenticable communication, wherein the at least one authentication mechanism at least partially comprises at least one correlation between at least one detectable element of the first electronic communication and the actual source of the first electronic communication;
   receiving a second electronic communication;
      wherein the second electronic communication comprises replicated content from an indicated source;
      comparing the indicated source to the actual source;
      determining that the indicated source does not comprise the actual source; and
      comparing at least one portion of the replicated content of the second electronic communication with at least one portion of the original content of the authenticable communication; and
      storing the at least one authentication mechanism in at least one memory resource.

10. The computer-implemented method of claim 9 further comprising:
   detecting the at least one detectable element within the second electronic communication.

11. The computer-implemented method of claim 9, wherein comparing the at least one portion of the replicated content of the second electronic communication with the at least one portion of the original content of the authenticable communication identifies at least one difference between the replicated content and the original content.

12. The computer-implemented method of claim 9, further comprising:
   determining at least one quantified representation of one or more results of the comparison between the original content of the authenticable communication and the replicated content of the second electronic communication.

13. The computer-implemented method of claim 12, wherein the at least one quantified representation comprises at least one indicator of a degree of similarity between the original content and the replicated content.

14. The computer-implemented method of claim 9, further comprising:
   transmitting at least one notification to the actual source, wherein the at least one notification indicates the receipt of the second electronic communication.

15. The computer-implemented method of claim 9, further comprising:
   transmitting at least one notification to at least one recipient of the second electronic communication, wherein the at least one notification indicates that the indicated source is not the actual source.

* * * * *